United States Patent
Ramagem et al.

(10) Patent No.: US 10,067,516 B2
(45) Date of Patent: Sep. 4, 2018

(54) METHOD AND SYSTEM TO CONTROL THERMOSTAT USING BIOFEEDBACK

(71) Applicant: Opower, Inc., Arlington, VA (US)

(72) Inventors: Daniel Bloomfield Ramagem, Derwood, MD (US); Oren Benjamin Yeshua, Arlington, VA (US); Crystal Hsiung, Falls Church, VA (US); Justin Spradlin, Arlington, VA (US); Wayne Lin, Washington, DC (US)

(73) Assignee: OPOWER, INC., Arlington, VA (US)

( * ) Notice: Subject to any disclaimer, the term of this patent is extended or adjusted under 35 U.S.C. 154(b) by 454 days.

(21) Appl. No.: 13/792,877

(22) Filed: Mar. 11, 2013

(65) Prior Publication Data
US 2014/0207292 A1    Jul. 24, 2014

(51) Int. Cl.
*G05D 23/19* (2006.01)
*G05B 15/02* (2006.01)

(52) U.S. Cl.
CPC ......... *G05D 23/1902* (2013.01); *G05B 15/02* (2013.01); *G05B 2219/2642* (2013.01)

(58) Field of Classification Search
CPC ........... G05D 23/1917; G05D 23/1902; G05B 15/02; G05B 2219/2642; F24F 11/00; F24F 11/0086; F24F 11/0091; F24F 11/001; F24F 11/0009; F24F 11/0034–11/0036
USPC .......................... 700/276–278; 165/200, 237
See application file for complete search history.

(56) References Cited

U.S. PATENT DOCUMENTS

| 4,334,275 | A | | 6/1982 | Levine |
| 4,502,290 | A | * | 3/1985 | Suzuki ................. F24F 11/0009 236/47 |
| 4,723,593 | A | * | 2/1988 | Kuribayashi ........ F24F 11/0009 165/11.1 |
| 4,843,575 | A | | 6/1989 | Crane |
| 5,100,053 | A | * | 3/1992 | Manson ............. G05D 23/1902 236/47 |

(Continued)

FOREIGN PATENT DOCUMENTS

| AU | 2010315015 | 7/2014 |
| CA | 2779754 | 5/2011 |

(Continued)

OTHER PUBLICATIONS

D'Urso et al., "A Simple Strategy for Life Signs Detection via an X-Band Experimental Set-Up," *Progress in Electromagnectics Research C*, vol. 9, pp. 119-129 (2009).

(Continued)

*Primary Examiner* — M. N. Von Buhr
(74) *Attorney, Agent, or Firm* — Cooper Legal Group, LLC.

(57) ABSTRACT

Illustrative embodiments of the present invention are directed to methods and systems for receiving physiological data of occupants of a building and using the information to control or regulate a controllable setpoint of a climate-control system for the building. The system may operatively interface with biofeedback sensors including wearable sensors and mountable sensors placed within a controlled space within the building. The system may adjust the controllable setpoint of the climate-control system based on a comfort metric associated with at least one of the occupant of the building, the comfort metric derived from the biofeedback data.

22 Claims, 11 Drawing Sheets

(56) References Cited

U.S. PATENT DOCUMENTS

| | | | |
|---|---|---|---|
| 5,395,042 A * | 3/1995 | Riley | F24F 11/0009 165/237 |
| 5,513,519 A | 5/1996 | Cauger et al. | |
| 5,566,084 A | 10/1996 | Cmar | |
| 5,717,609 A | 2/1998 | Packa et al. | |
| 5,855,011 A | 12/1998 | Tatsuoka | |
| 5,873,251 A | 2/1999 | Iino | |
| 5,930,773 A | 7/1999 | Crooks et al. | |
| 5,930,803 A | 7/1999 | Becker et al. | |
| 5,948,303 A | 9/1999 | Larson | 219/486 |
| 6,035,285 A | 3/2000 | Schlect et al. | |
| 6,088,688 A | 7/2000 | Crooks et al. | |
| 6,273,814 B1 | 8/2001 | Komoto | |
| 6,295,504 B1 | 9/2001 | Ye et al. | |
| 6,327,605 B2 | 12/2001 | Arakawa et al. | |
| 6,354,940 B1 | 3/2002 | Itou et al. | |
| D462,077 S | 8/2002 | Greminger | |
| 6,539,736 B1 | 4/2003 | Isazawa et al. | |
| 6,606,104 B1 | 8/2003 | Kondo et al. | |
| 6,701,298 B1 | 3/2004 | Jutsen | |
| 6,732,055 B2 | 5/2004 | Bagepalli et al. | |
| 6,778,945 B2 | 8/2004 | Chassin et al. | |
| 6,785,620 B2 | 8/2004 | Kishlock et al. | |
| 6,972,660 B1 * | 12/2005 | Montgomery et al. | 340/5.52 |
| 7,020,508 B2 | 3/2006 | Stivoric et al. | 600/390 |
| 7,073,073 B1 | 7/2006 | Nonaka et al. | |
| 7,073,075 B2 | 7/2006 | Freyman et al. | |
| 7,136,710 B1 | 11/2006 | Hoffberg et al. | |
| 7,142,949 B2 | 11/2006 | Brewster et al. | |
| 7,149,727 B1 | 12/2006 | Nicholls et al. | |
| 7,200,468 B2 | 4/2007 | Ruhnke et al. | |
| 7,243,044 B2 | 7/2007 | McCalla | |
| 7,333,880 B2 | 2/2008 | Brewster et al. | |
| 7,356,548 B1 | 4/2008 | Culp et al. | |
| D574,845 S | 8/2008 | Armstrong et al. | |
| 7,444,251 B2 | 10/2008 | Nikovski et al. | |
| 7,460,502 B2 | 12/2008 | Arima et al. | |
| 7,460,899 B2 | 12/2008 | Almen | 600/509 |
| 7,552,030 B2 | 6/2009 | Guralnik et al. | 702/188 |
| 7,561,977 B2 | 7/2009 | Horst et al. | |
| D605,652 S | 12/2009 | Plaisted et al. | |
| 7,764,180 B2 * | 7/2010 | Huang | B60H 1/00742 236/91 C |
| 7,878,890 B2 | 2/2011 | Toyohara et al. | |
| D635,988 S | 4/2011 | Mays et al. | |
| 7,991,513 B2 | 8/2011 | Pitt | |
| D645,469 S | 9/2011 | Gardner et al. | |
| 8,065,098 B2 | 11/2011 | Gautam | |
| D650,797 S | 12/2011 | Jang et al. | |
| 8,140,191 B2 * | 3/2012 | Kanai | A61B 5/16 436/181 |
| 8,166,047 B1 | 4/2012 | Cohen et al. | |
| D660,317 S | 5/2012 | Jesberger | |
| D660,867 S | 5/2012 | Marchetti | |
| 8,180,591 B2 | 5/2012 | Yuen et al. | 702/160 |
| D665,411 S | 8/2012 | Rai et al. | |
| 8,239,178 B2 | 8/2012 | Gray et al. | |
| D667,841 S | 9/2012 | Rai et al. | |
| 8,260,468 B2 | 9/2012 | Ippolito et al. | |
| 8,275,635 B2 | 9/2012 | Stivoric et al. | 705/3 |
| 8,280,536 B1 | 10/2012 | Fadell et al. | 700/83 |
| D671,550 S | 11/2012 | Chen et al. | |
| D674,840 S | 1/2013 | Van Den Broecke et al. | |
| 8,348,840 B2 * | 1/2013 | Heit et al. | 600/301 |
| 8,375,118 B2 | 2/2013 | Hao et al. | |
| 8,417,061 B2 | 4/2013 | Kennedy et al. | |
| 8,428,785 B2 | 4/2013 | Boucher et al. | |
| 8,429,630 B2 | 4/2013 | Nickolov et al. | |
| D682,882 S | 5/2013 | Cahill et al. | |
| 8,478,447 B2 * | 7/2013 | Fadell et al. | 700/278 |
| 8,489,245 B2 | 7/2013 | Carrel et al. | |
| D687,445 S | 8/2013 | Fuhrmann | |
| D689,095 S | 9/2013 | Nagaoka et al. | |
| D691,631 S | 10/2013 | Aroner et al. | |
| D694,252 S | 11/2013 | Helm | |
| 8,583,288 B1 | 11/2013 | Rossi et al. | |
| D697,526 S | 1/2014 | Bruck et al. | |
| 8,630,740 B2 * | 1/2014 | Matsuoka | H04L 12/2825 700/12 |
| 8,630,741 B1 * | 1/2014 | Matsuoka et al. | 700/276 |
| 8,660,813 B2 | 2/2014 | Curtis et al. | |
| D701,867 S | 4/2014 | Thompson et al. | |
| D703,690 S | 4/2014 | MacCubbin et al. | |
| 8,690,751 B2 * | 4/2014 | Auphan | 600/28 |
| D705,263 S | 5/2014 | Hartley | |
| D707,245 S | 6/2014 | Bruck et al. | |
| 8,751,432 B2 * | 6/2014 | Berg-Sonne et al. | 706/48 |
| 8,768,520 B2 * | 7/2014 | Oexman | A47C 27/061 5/421 |
| D710,871 S | 8/2014 | McCormack et al. | |
| D711,415 S | 8/2014 | Simister et al. | |
| 8,805,000 B2 | 8/2014 | Derby et al. | |
| 8,818,758 B1 | 8/2014 | Singh et al. | |
| D714,335 S | 9/2014 | Cojuangco et al. | |
| 8,850,348 B2 * | 9/2014 | Fadell | G05D 23/1902 236/46 R |
| 8,868,248 B2 | 10/2014 | Park | |
| D717,328 S | 11/2014 | Lin | |
| 8,918,219 B2 * | 12/2014 | Sloo | F24F 11/0086 236/1 C |
| D720,767 S | 1/2015 | Miller et al. | |
| 8,954,849 B2 | 2/2015 | Doi et al. | |
| D725,133 S | 3/2015 | Smirin et al. | |
| D725,664 S | 3/2015 | Nies et al. | |
| 9,020,647 B2 * | 4/2015 | Johnson | F24F 11/001 700/276 |
| D729,268 S | 5/2015 | Nies et al. | |
| D730,386 S | 5/2015 | Ryan et al. | |
| 9,031,703 B2 | 5/2015 | Nakamura et al. | |
| D731,538 S | 6/2015 | Lee | |
| D732,049 S | 6/2015 | Amin | |
| D732,062 S | 6/2015 | Kwon | |
| D737,842 S | 9/2015 | Francisco et al. | |
| D739,436 S | 9/2015 | Kadosh | |
| D740,847 S | 10/2015 | Yampolskiy et al. | |
| 9,429,923 B2 * | 8/2016 | Ward | G05B 15/02 |
| 9,459,018 B2 * | 10/2016 | Fadell | F24F 11/0009 |
| 2001/0047290 A1 | 11/2001 | Petras et al. | |
| 2002/0065581 A1 | 5/2002 | Fasca | |
| 2002/0149611 A1 | 10/2002 | May | |
| 2002/0163540 A1 | 11/2002 | Kishimoto | |
| 2002/0178047 A1 | 11/2002 | Or et al. | |
| 2002/0198629 A1 | 12/2002 | Ellis | |
| 2003/0011486 A1 | 1/2003 | Ying | |
| 2003/0018517 A1 | 1/2003 | Dull et al. | |
| 2003/0023467 A1 | 1/2003 | Moldovan | |
| 2003/0216971 A1 | 11/2003 | Sick et al. | |
| 2004/0024717 A1 | 2/2004 | Sneeringer | |
| 2004/0073537 A1 | 4/2004 | Thiesson et al. | |
| 2004/0111410 A1 | 6/2004 | Burgoon et al. | |
| 2004/0140908 A1 | 7/2004 | Gladwin et al. | |
| 2004/0260407 A1 | 12/2004 | Wimsatt | |
| 2005/0040247 A1 | 2/2005 | Pouchak | |
| 2005/0096797 A1 * | 5/2005 | Matsubara | H02J 3/00 700/291 |
| 2005/0121530 A1 * | 6/2005 | Song | A47C 21/044 236/44 C |
| 2005/0257540 A1 | 11/2005 | Choi et al. | 62/180 |
| 2006/0089851 A1 | 4/2006 | Silby et al. | |
| 2006/0093222 A1 | 5/2006 | Saffer et al. | |
| 2006/0103549 A1 | 5/2006 | Hunt et al. | |
| 2006/0195438 A1 | 8/2006 | Galuten | |
| 2006/0246968 A1 | 11/2006 | Dyke-Wells | |
| 2007/0061735 A1 | 3/2007 | Hoffberg et al. | |
| 2007/0168425 A1 | 7/2007 | Morotomi | |
| 2007/0185835 A1 | 8/2007 | Ursitti et al. | |
| 2007/0198459 A1 | 8/2007 | Boone et al. | |
| 2007/0203860 A1 | 8/2007 | Golden et al. | |
| 2007/0213992 A1 | 9/2007 | Anderson et al. | |
| 2007/0255457 A1 | 11/2007 | Whitcomb et al. | |
| 2007/0260405 A1 | 11/2007 | McConnell et al. | |
| 2007/0270994 A1 | 11/2007 | Dobson et al. | |

(56) References Cited

U.S. PATENT DOCUMENTS

| | | | |
|---|---|---|---|
| 2007/0287892 A1* | 12/2007 | Estrella | A61B 5/02055 600/300 |
| 2008/0027885 A1 | 1/2008 | van Putten et al. | |
| 2008/0033587 A1 | 2/2008 | Kurita et al. | |
| 2008/0167535 A1 | 7/2008 | Stivoric et al. | 600/301 |
| 2008/0189632 A1 | 8/2008 | Tien et al. | |
| 2008/0195561 A1 | 8/2008 | Herzig | |
| 2008/0222561 A1 | 9/2008 | Helfman et al. | |
| 2008/0244429 A1 | 10/2008 | Stading | |
| 2008/0281473 A1 | 11/2008 | Pitt | |
| 2008/0281763 A1 | 11/2008 | Yliniemi | |
| 2008/0304112 A1 | 12/2008 | Matsuno | |
| 2008/0306985 A1 | 12/2008 | Murray et al. | |
| 2008/0320523 A1 | 12/2008 | Morris et al. | |
| 2009/0106202 A1 | 4/2009 | Mizrahi | |
| 2009/0106674 A1 | 4/2009 | Bray et al. | |
| 2009/0122079 A1 | 5/2009 | Nishioka | |
| 2009/0204267 A1 | 8/2009 | Sustaeta et al. | |
| 2009/0217175 A1 | 8/2009 | Bechtel et al. | |
| 2009/0217179 A1 | 8/2009 | Mons et al. | |
| 2009/0326726 A1 | 12/2009 | Ippolito et al. | |
| 2010/0025483 A1 | 2/2010 | Hoeynck et al. | |
| 2010/0076835 A1 | 3/2010 | Silverman | |
| 2010/0082174 A1 | 4/2010 | Weaver | |
| 2010/0099954 A1 | 4/2010 | Dickinson et al. | 600/300 |
| 2010/0106575 A1 | 4/2010 | Bixby et al. | |
| 2010/0138363 A1 | 6/2010 | Batterberry et al. | |
| 2010/0156665 A1 | 6/2010 | Krzyzanowski et al. | |
| 2010/0179704 A1 | 7/2010 | Ozog | |
| 2010/0180223 A1 | 7/2010 | Speier | |
| 2010/0198713 A1 | 8/2010 | Forbes, Jr. et al. | |
| 2010/0217452 A1 | 8/2010 | McCord et al. | |
| 2010/0217549 A1 | 8/2010 | Galvin et al. | |
| 2010/0217550 A1 | 8/2010 | Crabtree et al. | |
| 2010/0217642 A1 | 8/2010 | Crubtree et al. | |
| 2010/0217651 A1 | 8/2010 | Crabtree et al. | |
| 2010/0232671 A1 | 9/2010 | Dam et al. | |
| 2010/0241648 A1 | 9/2010 | Ito et al. | |
| 2010/0286937 A1 | 11/2010 | Hedley et al. | |
| 2010/0289643 A1 | 11/2010 | Trundle et al. | |
| 2010/0324962 A1 | 12/2010 | Nesler et al. | |
| 2010/0332373 A1 | 12/2010 | Crabtree et al. | |
| 2011/0022429 A1 | 1/2011 | Yates et al. | |
| 2011/0023045 A1 | 1/2011 | Yates et al. | |
| 2011/0040666 A1 | 2/2011 | Crabtree et al. | |
| 2011/0055131 A1 | 3/2011 | Chen | |
| 2011/0061014 A1 | 3/2011 | Frader-Thompson et al. | |
| 2011/0063126 A1 | 3/2011 | Kennedy et al. | |
| 2011/0106316 A1 | 5/2011 | Drew et al. | |
| 2011/0106328 A1 | 5/2011 | Zhou et al. | |
| 2011/0106471 A1 | 5/2011 | Curtis et al. | |
| 2011/0153102 A1 | 6/2011 | Tyagi et al. | |
| 2011/0166710 A1* | 7/2011 | Kordik | H02J 3/14 700/277 |
| 2011/0169603 A1* | 7/2011 | Fithian | G06Q 10/00 340/5.52 |
| 2011/0178842 A1 | 7/2011 | Rane et al. | |
| 2011/0178937 A1 | 7/2011 | Bowman | |
| 2011/0190951 A1 | 8/2011 | Lee | |
| 2011/0205245 A1 | 8/2011 | Kennedy et al. | |
| 2011/0231320 A1 | 9/2011 | Irving | |
| 2011/0251730 A1 | 10/2011 | Pitt | |
| 2011/0251807 A1 | 10/2011 | Rada et al. | |
| 2011/0282505 A1 | 11/2011 | Tomita et al. | |
| 2011/0313964 A1 | 12/2011 | Sanchey Loureda et al. | |
| 2012/0036250 A1 | 2/2012 | Vaswani et al. | |
| 2012/0053740 A1 | 3/2012 | Venkatakrishnan et al. | |
| 2012/0066168 A1 | 3/2012 | Fadell et al. | 706/52 |
| 2012/0078417 A1 | 3/2012 | Connell, II et al. | |
| 2012/0084063 A1 | 4/2012 | Drees et al. | |
| 2012/0105816 A1 | 5/2012 | Ozawa | |
| 2012/0117503 A1 | 5/2012 | Hofrichter et al. | |
| 2012/0144293 A1 | 6/2012 | Kim | |
| 2012/0165993 A1* | 6/2012 | Whitehouse | G05D 23/1904 700/278 |
| 2012/0179692 A1 | 7/2012 | Hsiao et al. | |
| 2012/0215369 A1 | 8/2012 | Desai et al. | |
| 2012/0216123 A1 | 8/2012 | Shklovskii et al. | |
| 2012/0259678 A1 | 10/2012 | Overturf et al. | |
| 2012/0290230 A1 | 11/2012 | Berges Gonzalez et al. | |
| 2012/0310708 A1 | 12/2012 | Curtis et al. | |
| 2012/0313746 A1* | 12/2012 | Rahman | A61B 5/0024 340/5.1 |
| 2013/0035992 A1* | 2/2013 | Silverman | G06Q 30/0233 705/14.1 |
| 2013/0036549 A1* | 2/2013 | McKlarney | A47C 21/044 5/413 R |
| 2013/0060531 A1 | 3/2013 | Burke et al. | |
| 2013/0060720 A1 | 3/2013 | Burke | |
| 2013/0097177 A1 | 4/2013 | Fan et al. | |
| 2013/0097481 A1 | 4/2013 | Kotler et al. | |
| 2013/0103656 A1 | 4/2013 | Sanchez Loureda et al. | |
| 2013/0172022 A1 | 7/2013 | Seymour et al. | |
| 2013/0173064 A1 | 7/2013 | Fadell et al. | |
| 2013/0194066 A1* | 8/2013 | Rahman | G05B 1/01 340/5.51 |
| 2013/0253709 A1* | 9/2013 | Renggli et al. | 700/278 |
| 2013/0261799 A1* | 10/2013 | Kuhlmann et al. | 700/275 |
| 2013/0262040 A1 | 10/2013 | Buckley | |
| 2013/0263034 A1 | 10/2013 | Bruck et al. | |
| 2013/0325196 A1* | 12/2013 | Basson | G05D 23/1902 700/291 |
| 2014/0006314 A1 | 1/2014 | Yu et al. | |
| 2014/0019319 A1 | 1/2014 | Derby et al. | |
| 2014/0074300 A1 | 3/2014 | Shilts et al. | |
| 2014/0107850 A1 | 4/2014 | Curtis | |
| 2014/0148706 A1 | 5/2014 | Van Treeck et al. | |
| 2014/0163746 A1 | 6/2014 | Drew et al. | |
| 2014/0278220 A1* | 9/2014 | Yuen | G01B 21/16 702/150 |
| 2014/0337107 A1 | 11/2014 | Foster | |
| 2014/0365965 A1 | 12/2014 | Bray et al. | |
| 2015/0088272 A1* | 3/2015 | Drew | H04L 67/10 700/12 |
| 2015/0095310 A1 | 4/2015 | Beaurepaire | |
| 2015/0142180 A1* | 5/2015 | Matsuoka | G05B 15/02 700/276 |
| 2015/0153929 A1 | 6/2015 | Bernstein et al. | |
| 2015/0156074 A1 | 6/2015 | Yamada et al. | |
| 2015/0188724 A1 | 7/2015 | Kim et al. | |
| 2015/0227152 A1* | 8/2015 | Willig | H04L 67/125 700/295 |
| 2015/0227522 A1 | 8/2015 | O'Donnell et al. | |
| 2015/0227846 A1 | 8/2015 | Mercer et al. | |
| 2015/0254246 A1 | 9/2015 | Sheth et al. | |
| 2015/0267935 A1 | 9/2015 | Devenish et al. | |
| 2015/0269664 A1 | 9/2015 | Davidson | |
| 2015/0286388 A1 | 10/2015 | Jeon et al. | |
| 2015/0300831 A1 | 10/2015 | Sernicola | |
| 2015/0310019 A1 | 10/2015 | Royer et al. | |
| 2015/0310463 A1 | 10/2015 | Turfboer et al. | |
| 2015/0310465 A1 | 10/2015 | Chan et al. | |
| 2015/0319119 A1 | 11/2015 | Ryu et al. | |
| 2015/0324819 A1 | 11/2015 | Lin et al. | |
| 2015/0326679 A1 | 11/2015 | Lin et al. | |
| 2016/0005015 A1 | 1/2016 | Curtis | |
| 2016/0018122 A1 | 1/2016 | Frank et al. | |
| 2016/0018832 A1 | 1/2016 | Frank et al. | |
| 2016/0047569 A1* | 2/2016 | Fadell | G05D 23/1902 236/1 C |
| 2017/0045864 A1* | 2/2017 | Fadell | F24F 11/0009 |
| 2017/0146261 A1* | 5/2017 | Rogers | F24F 11/0012 |

FOREIGN PATENT DOCUMENTS

| | | | |
|---|---|---|---|
| CA | 2832211 | 11/2012 | |
| DE | 3703387 | 8/1987 | |
| DE | 10 2011 077 522 | 12/2012 | G01W 1/17 |
| EP | 0003010 | 7/1979 | |
| EP | 2705440 | 3/2014 | |
| EP | 2496991 | 9/2014 | |
| GB | 1 525 656 | 9/1978 | F24D 13/02 |
| GB | 2 238 405 | 5/1991 | G05B 11/32 |

(56) References Cited

FOREIGN PATENT DOCUMENTS

| | | | | |
|---|---|---|---|---|
| JP | 2000-270379 | 9/2000 | | |
| JP | 2004-233118 | 8/2004 | | |
| JP | 2006-119931 | 5/2006 | | |
| JP | 2007-133468 | 5/2007 | | |
| JP | 2011-027305 | 2/2011 | | |
| JP | 2012-080679 | 4/2012 | | |
| JP | 2012-080681 | 4/2012 | | |
| JP | 2013-020307 | 1/2013 | | |
| WO | WO 03/102865 | 12/2003 | ............... | G06N 5/00 |
| WO | WO 03/104941 | 12/2003 | | |
| WO | WO 2008/101248 | 8/2008 | ............ | G06Q 50/00 |
| WO | WO 2009/085610 | 7/2009 | | |
| WO | WO 2011/057072 | 5/2011 | | |
| WO | WO 2012/112358 | 8/2012 | | |
| WO | WO 2012/154566 | 11/2012 | | |
| WO | WO 2014/004148 | 1/2014 | | |
| WO | WO 2014/182656 | 11/2014 | | |

OTHER PUBLICATIONS

Ecobee, "More than just a thermostat.," http://www.ecobee.com, 4 pages, Jul. 16, 2013.

Fitbit Official Site, "Flex, One & Zip Wireless Activity & Sleep Trackers," http://www.fitbit.com/,4 pages, Jul. 15, 2013.

Nest, "The Learning Thermostat," http://www.nest.com, 2 pages, Jul. 15, 2013.

Nike.com, "Nike + FuelBand. Tracks your all-day activity and helps you do more . . . ," http://www.nike.com/us/en_us/c/nikeplus-fuelband, 7 pages, Jul. 15, 2013.

Sawka et al., "Human Adaptations to Heat and Cold Stress," RTO—MP-076, 16 pages, Oct. 2001.

UP by Jawbone, "Know yourself Live better." https://jawbone.com/up/, 7 pages, Jul. 15, 2013.

International Searching Authority, International Search Report—International Application No. PCT/US2014/012443, together with the Written Opinion of the International Searching Authority, 9 pages, dated Apr. 23, 2014.

International Search Report and Written Opinion for PCT Application No. PCT/US2015/038692, dated Sep. 24, 2015, 13 pages.

International Preliminary Report on Patentability for PCT Application No. PCT/US2010/055621, dated May 15, 2012, 8 pages.

International Search Report and Written Opinion for PCT Application No. PCT/US2010/055621, dated Dec. 23, 2010, 9 pages.

International Search Report and Written Opinion for PCT Application No. PCT/US2012/036539, dated Jul. 6, 2012, 8 pages.

International Preliminary Report on Patentability for PCT Application No. PCT/US2012/036539, dated Nov. 21, 2013, 7 pages.

International Search Report and Written Opinion for PCT Application No. PCT/US2013/046126, dated Aug. 22, 2013, 9 pages.

International Preliminary Report on Patentability for PCT Application No. PCT/US2013/046126, dated Jan. 8, 2015, 8 pages.

International Search Report for PCT Application No. PCT/US2014/036901, dated Aug. 28, 2014, 3 pages.

Patent Examination Report No. 1 for Australian Patent Application No. 2010315015, dated Dec. 17, 2013, 3 pages.

Extended European Search Report for European Patent Application No. 12782569.3, dated Nov. 27, 2014, 7 pages.

Author Unknown, "An Inconvenient Truth," Jan. 9, 2008, 2 pages, available at http://web.archive.org/web/2008019005509/http://www.climatecrisis.net/takeaction/carbonca/.

Author Unknown, "Calculate Your Impact," Jul. 28, 2008, 4 pages, available at http://web.archive.org/web/20080728161614/http://green.yahoo.com/calculator/.

Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.

Author Unknown, "CoolClimate Calculator," May, 19,2008, 15 pages, available at http://web.archive.orgiweb/20080519220643/bie.berkeley.edu/coolcale/calculations.html.

Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.

Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.

Chen, Hanfeng, et al., "Testing for a Finite Mixture Model With Two Components," Journal of the Royal Statistical Society, Series B, vol. 66, No. 1, 26 pages, 2004.

De Prensa, Boletine, "Txu Energy Budget Alerts Give Consumers Control of Electricity Costs," TXU Energy, http://www.txu.com/es/about/press, 2 pages, May 23, 2012.

Deb, Partha, "Finite Mixture Models," Hunter College and the Graduate Center, CUNY NBER, FMM Slides, 42 pages, Jul. 2008.

Eckmann, J.P., et al., "Ergodic theory of chaos and strange attractors," Reviews of Modern Physics, vol. 57, No. 3, Part I, pp. 617-656, Jul. 1985.

Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.

Fels, Margaret F., "PRISM: An Introduction," Elsevier Sequoia, Energy and Buildings, vol. 9, pp. 5-18, 1986.

Fels, Margaret F., et al., Seasonality of Non-heating Consumption and Its effect on PRISM Results, Elsevier Sequoia, Energy and Buildings, vol. 9, pp. 139-148, 1986.

Figueiredo, Vera, et al., "An Electric Energy Consumer Characterization Framework Based on Data Mining Techniques," IEEE Transactions on Power Systems, vol. 20, No. 2, pp. 596-602, May 2005.

Friedman, Jerome, et al., "Regularization Paths for Generalized Linear Models via Coordinate Descent," Journal of Statistical Solfware, vol. 33, Iss. 1, pp. 1-22, Jan. 2010.

Goldberg, Miriam L., et al., "Refraction of PRISM Results into Components of Saved Energy," Elsevier Sequoia, Energy and Buildings, vol. 9, pp. 169-180, 1986.

Jansen, R.C., "Maximum Likelihood in a Generalized Linear Finite Mixture Model by Using the EM Algorithm," Biometrics, vol. 49, pp. 227-231, Mar. 1993.

Leisch, Friedrich, "FlexMix: A General Framework Regression in R," Journal of Statistical Software, 2004. for Finite Mixture http://www.jstatsoft.org/, Models and Latent Class vol. 11 (8), pp. 1-18, Oct. 2004.

Liang, Jian, et al. "Load Signature Study—Part II: Disaggregation Framework, Simulation, and Applications," IEEE Transactions on Power Delivery, vol. 25, No. 2, pp. 561-569, Apr. 2010.

Liang, Jian, et al., "Load Signature Study—Part I: Basic Concept, Structure, and Methodology," IEEE Transactions on Power Delivery, vol. 25, No. 2, pp. 551-560, Apr. 2010.

Mint.com, "Budgets you'll actually stick to," Budgeting—Calculate and Categorize your spending, https://www.mint.com/how-it-works/budgeting/, 2 pages, Jul. 12, 2013.

Mint.com, "We're always on alert." Alerts for bills, fees & going over budget, https://www.mint.com/how-it-works/alerts/.

Mori, Hiroyuki, "State-of-the-Art Overview on Data Mining in Power Systems," IEEE, pp. 33-37, 2006.

Muthen, Bengt, et al., Finite Mixture Modeling with Mixture Outcomes Using the EM Algorithm, Biometrics, vol. 55, pp. 463-469, Jun. 1999.

Rose, O. "Estimation of the Hurst Parameter of Long-Range Dependent Time Series," University of Wuirzburg, Institute of Computer Science, Research Report Series, Report No. 137, 15 pages, Feb. 1996.

(56) References Cited

OTHER PUBLICATIONS

Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.
Aragon, Liz, "Black and White Emoticons," posted at Sweet Clip Art, posting date Apr. 29, 2012. © 2011 2015 Elizabeth J. Aragon, [online], [site visited Nov. 18, 2015], available at http://sweetclipart.com/blackandwhiteemoticons838>.
Author Unknown, "Collection of difference emoticon icon of house on white background," 1 page, posted at Stockphotos, posting date not given, © 2016 Stockphotos.ro. [online], [site visited Jan. 7, 2016], available at http://www.stockphotos.ro/collectiondifferenceemoticoniconhousewhitebackirnage58528865.html.
Blaine, Joel, "Seven Cities and a Utility Company Team Up to Deliver Energy Savings," 4 pages, posted at Dept. of Energy, posting date Aug. 1, 2011, [online], [site visited 11/13/15], available at http://energy.gov/articles/sevencitiesandutilitycompanyteamdeliverresidentialenergysavings>.
Boonmas, Sunyaluk, "Stock Photo: 16 Smiley Face Icon Set"—Image: 39092543, posting date not given, Copyright @ 2000-2015 Dreamstime.com, available at http://www.dreamstime.com/stockphotossmileyfaceiconsetmaximumyouremotionemoticonsthshowshappysadsurprisewowetcimage39092543>.
Freepik, Surprised emoticon square face with open eyes and mouth, posted at Flat Icon, posting date not given. © 2013-2015 Graphic Resources SL. [online], [site visited Nov. 18, 2015], available at http://www.flaticon.com/freeicon/surprisedemoticonsquarefacewithopeneyesandmouth_42835>.
Gelber, Bob, "This Is Not a Bill," posted at Not a Mystery, posting date 4/1812015, [online], [site visited Nov. 13, 2015], available at http://notamystery.com/2015/04/18/not_worth_the_papeUts_printed_on/>.
Karsten, "Green nudge: the classic social comparison experiment by Opower," posted at iNudgeyou, posting date Nov. 28, 2012, [online], [site visited Nov. 12, 2015], available at http://inudgeyou.com/greennudgetheclassicsocialcomparisonexperimentbyopower/>.
Laskey, Alex, et al., "Opower," posted at ACM, posting date Jun. 2011, Copyright © 2015 by the ACM. [online], [site visited Nov. 13, 2015], available at http://xrds.acm.org/article.cfm?aid=1961687>.
Marshall, Jonathan, "PG&E Home Energy Reports Stimulate Big Customer Savings," posted at PG&E Currents, posting date May 14, 2014, © 2014 Pacific Gas and Electric Company. [online], [site visited Nov. 13, 2015], available at http://www.pgecurrents.com/2014/05/14/pgehomeenergyreportsstimulatebigcustomersavings/>.
Morabito, Kerri, "High User Campaign," posted at Kerri Morabito, posting date not given, © Kerri Morabito 2015. [online], [site visited Nov. 13, 2015]. Available from Internet, <URL: http://www.kerrimorabito.com/high-user-campaign.html>.
Rocheleau, Jake, "38 Amazingly Well-Designed Emoji Iconsets," posted at SpyreStudios, posting date Mar. 25, 2015, SpyreStudios © 2015, [online], [site visited Nov. 18, 2015], available at http://spyrestudios.com/38welldesignedemojiiconsets/>.
Sen, Ashish, et al. "Regression Analysis—Theory, Methods, and Applications," 1990, 27 pages, Springer-Verlag, New York.
Tinjum, Aaron, "Opower and FirstFuel are joining forces to usher in a new era of customer engagement," posted at Opower Blog, posting date Sep. 9, 2014. [online], [site visited Jan. 7, 2016], available at http://blog.opower.com/2014/09/opowerfirstfuelpartnership/.

\* cited by examiner

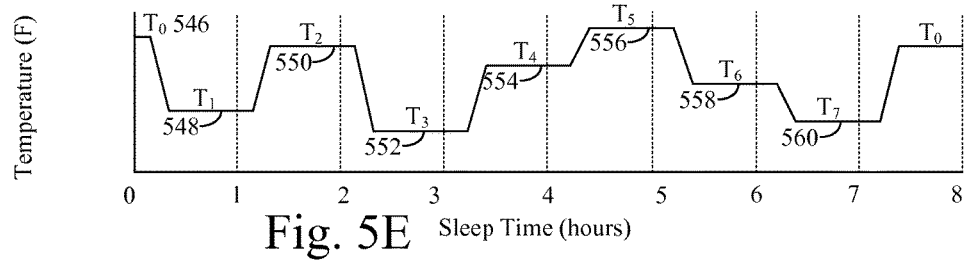
Fig. 5E  Sleep Time (hours)
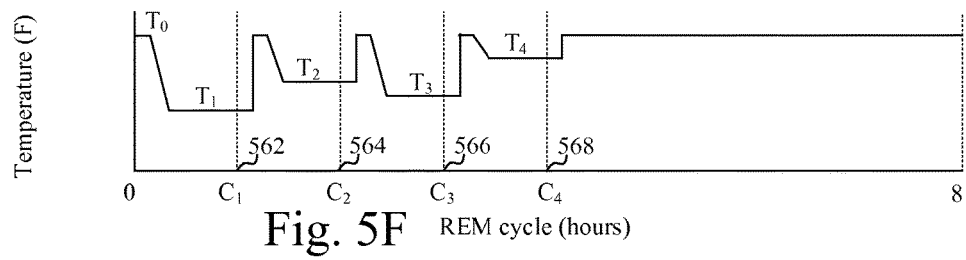
Fig. 5F  REM cycle (hours)
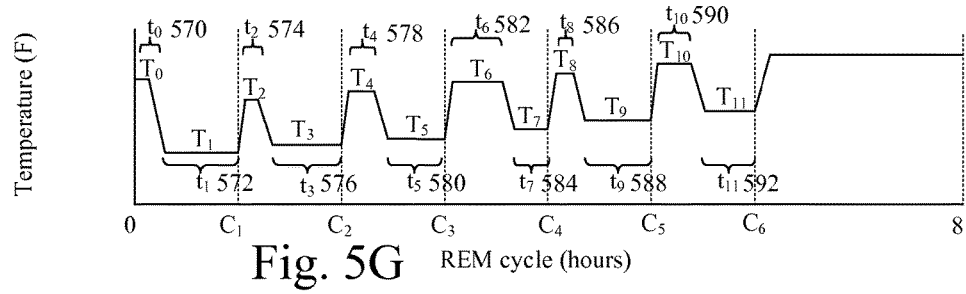
Fig. 5G  REM cycle (hours)

METHOD AND SYSTEM TO CONTROL THERMOSTAT USING BIOFEEDBACK

RELATED APPLICATION

The present application claims priority from Provisional Application No. 61/755,086, filed Jan. 22, 2013, titled "Method and System to Control Thermostat Using Biofeedback." The application is incorporated by reference herein in its entirety.

TECHNICAL FIELD

The present invention relates to energy controls, more particularly to the controls of a programmable thermostat.

BACKGROUND

As is generally known, a programmable thermostat allows a building occupant to set control levels of a building climate-control system, but provides little or no assistance to the building occupant in making decisions on setting them. Typically, a building occupant experiments by trial and error to determine a suitable temperature setting. This process is generally subjective. As a result, the trial and error may yield a nominal solution that does not achieve the efficiency performance entitled by the occupant.

Additionally, once set, a programmable thermostat generally provides a rigid controls schedule that is specified for a given time. For example, a building occupant may set a lower temperature level before going to bed and then raise the level in the subsequent morning in order to maximize his or her comfort and energy efficiency. As such, rather than controlling based on an activity or context, the controls is based on time, which is treated as an approximation to the activity. Thus, any variations as to when the occupant engages in the activity, for example, a different bedtime, may result in a sub-optimal solution.

There is a benefit in having a programmable thermostat that establishes optimally efficient control levels using little or no assistance from the occupant.

SUMMARY OF THE EMBODIMENTS

An embodiment provides a thermostat having included a communication port and a controller. The communication port is configured to interface with a climate-control system of a building, such as a heating-ventilation and air-conditioning (HVAC) system. The controller is configured to establish, via the communication port, a control setpoint of the climate-control system. The control setpoint may be associated with temperature, humidity, or ventilation of a controlled space in the building. The controller may establish the control setpoint for an activity state of an occupant in the building. The control setpoint may be determined from biofeedback data associated with an occupant of the controlled space.

According to an illustrative embodiment, the control setpoint may be established at a lower energy usage state for the climate-control system in a manner that does not affect the activity state. For example, during the sleep state, the control setpoint may be set to a lower or higher temperature setting, depending on whether the night is warm or cool, until a physiological response is observed or detected. Alternatively, the control setpoint may be established at a lower energy usage state for the climate-control system by determining at least one of a comfort threshold and a discomfort threshold from the biofeedback data and then establishing the control setpoint as a pre-determined offset from determined threshold. The threshold may be determined based on a series of observation made within the operating envelope specified by the occupant. Alternatively, the threshold may be determined based on a pre-stored experiment routine to stimulate varying-biofeedback responses of the occupant. The stimulated responses provide a learning routine to determine an environment envelope that is acceptable and/or unacceptable to the occupant or that produces desirable and undesirable physiological responses of the occupant. As such, a control setpoint that is optimally balanced between energy usage and comfort may be derived. The experiment routine may include the controller varying the control setpoint according to a set of pre-determined routine. The thermostat may include a memory to store a set of pre-determined routines. The experiment routine may operate during a sleeping period of the occupant. The experiment routine may be initiated by the thermostat receiving a manual input from an occupant indicating an on-set of the sleeping period. Alternatively, the controller may determine that the occupant is in a sleep state based on physiological state of the occupant derived from the biofeedback data.

The control setpoint may be also established at a higher energy usage state for the climate-control system in a manner to improve an activity state. For example, during exercise, the control setpoint may be set to a lower temperature setting to minimize overheating by the occupant.

The sensors may include a wearable biofeedback sensor wore by an occupant of the building or a mountable biofeedback sensor mounted within the controlled space. A wearable biofeedback sensor may be any of various types of sensors, including an accelerometer, a pedometer, an electromyograph, an electrodermograph, an electroencephalograph, a photoplethysmograph, an electrocardiograph, a pneumograph, a capnometer, a pheoencephalograph, and a hemoencephalograph. A mountable biofeedback sensor may also be any of various sensors, including a motion sensor, a proximity sensor, and a microphone.

The controlled space may include a room associated with sleeping and a room associated with exercising. In an embodiment associated with sleep, the biofeedback data may include information associated with movements of the occupant and the quality of sleep of the occupant. The controller may adjust the control setpoint based upon, for example, a determined stage of sleep derived from the biofeedback data. The controller may also establish the control setpoint in a manner that the quality of sleep of the occupant remains unchanged. For example, the controller may monitor for physiological indication of discomfort, such as snoring, twisting and turning, and unexpected exit of sleep or sleep state. The biofeedback data includes datasets from a plurality of nights.

In an embodiment associated with exercise, the controller may adjust the control setpoint by lowering temperature setpoint associated with the controlled space when the occupant therein is exercising. The control setpoint may be lowered in a manner that the body temperature of the occupant remains generally constant. The control setpoint may be determined using information of the occupant associated with the body-mass-index, the weight, and the percent body fat.

In an embodiment, the controller may be part of a thermostat that is operatively installed at the premises. The thermostat may directly or indirectly interface with biofeedback sensors. According to another embodiment, the thermostat may interface with an external database or service that provides the biofeedback data to the thermostat. As such, a communicating thermostat may have a communication port that is configured to interface with the external database to receive the biofeedback data of biofeedback sensors. According to another embodiment, a communicating thermostat is employed to operatively interface with an external server (referred to as a processing unit), which determines the control setpoint from the biofeedback data. As such, the controller may receive the control setpoint from the external server. The external server may interface directly with the thermostat or indirectly, for example, through a home controller or residential network gateways.

In another embodiment, a method of controlling a climate-control system in a building is described. The climate-control system may have a control setpoint associated with at least one of temperature, humidity, and ventilation of a controlled space in the building. The method may include receiving biofeedback data from a set of biofeedback sensors configured to monitor the occupant. At least one of the set of biofeedback sensors may include a wearable biofeedback sensor wore by the occupant or a mountable biofeedback sensor mounted within the controlled space. The method may include determining, via a processor, control setpoint for an activity state of the occupant. The control setpoint may be determined from the biofeedback data. The method may include causing the establishing of the control setpoint for the climate-control system for a portion of the controlled space using the determined control setpoint.

In establishing the control setpoint, the method may include lowering a temperature setpoint associated with the controlled space when the occupant of the controlled space is asleep. This may be done in a manner that the physiological responses of the occupant remain unchanged. The physiological responses being associated with the quality of sleep of the occupant that may be derived from the biofeedback data. The control setpoint may be determined by correlating the biofeedback data to at least one of the control setpoint and climate information at respective time intervals, the correlation including using at least one of linear regression, logistic regression, dynamic programming, Hidden Markov Models, Monte Carlo Methods, and Expectation/Maximization optimization techniques.

In another embodiment, a method of controlling a climate-control system in a building is described. The climate-control system may have a control setpoint associated with at least one of temperature, humidity, and ventilation of a controlled space in the building. The method may include receiving a calculated control setpoint for the climate-control system via a communication port. The method may then include establishing a control setpoint of the climate-control system using the received calculated control setpoint. The calculated control setpoint is determined from biofeedback data associated with an occupant in the controlled space.

The described method may be employed as a computer program product, which is stored on a machine-readable medium, or computer data signal, embodied by an electromagnetic wave, comprising program code to be executed, particularly, in a computer.

BRIEF DESCRIPTION OF THE DRAWINGS

The foregoing features of embodiments will be more readily understood by references to the following detailed description, taken with reference to the accompanying drawings, in which:

FIGS. 5A-G illustrate various scheduling routines to vary the sleep control setpoint;

DETAILED DESCRIPTION OF SPECIFIC EMBODIMENTS

Figure 1:
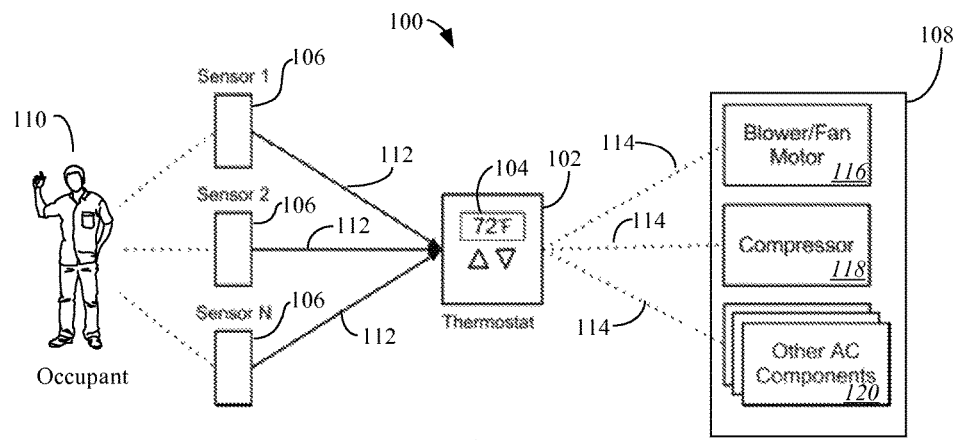
FIG. 1 schematically shows a system controlled using biofeedback data according to an illustrative embodiment.

As used herein, the term "biofeedback" refers to information that may be directly or indirectly correlated to a physiological response or activity of a person. The response may be correspond to a physical or mental state of comfort, or a lack thereof, that the person experiences from his or her surroundings, including when the person is awake or sleeping.

A climate-control system (e.g., a heating-ventilation and air conditioning (HVAC) system) maintains and regulates, for example, temperature, humidity, ventilation, lighting, and sound of a space to provide a comfortable environment for an occupant of that space. The climate-control system generally expends energy in order to provide such comfort. Occupants of a building may balance their expenditure of energy with their respective comfort, which are manifested in the control setpoint of the controller of the climate-control system. An example of such controllers includes programmable thermostats, as well as building energy management systems, which are interchangeably used herein. A climate-control system or a controller thereof may be part of (i.e., integrated or operatively connected to) a home energy system that may have controllable nodes in appliances, power generation equipment (e.g., photovoltaic or generators), heat pumps, ventilation systems, lighting systems, fire control or detection systems, and security systems.

A control setpoint or controllable setpoint refers to a control setting of a climate-control system and corresponds to a temperature and possibly humidity, ventilation, lighting, and sound of a space. As such, the controllable setpoint of a climate-control system are values or parameters that a control system regulates or maintains based on an observable measurement. For example, a HVAC system that controls temperature and have temperature sensors within its control space has temperature control setpoints. The controllable setpoint may also include specific control of components within the climate-control system. For example, the controllable setpoint may include cycle times or fan run-times for an AC or furnace.

Rather than having an occupant make decisions on a control setpoint (e.g., for temperature level), embodiments of the present invention allow for the controller of the climate-control system to be self-established using the occupant's physiological response without or with little occupant's engagement in the data collection and analysis. In being able to regulate energy usage based on physiological responses of the occupants, the various embodiments may systematically optimize or enhance energy usage within a controlled space of the building. As such, the optimized control may allow the various embodiments to be more aggressive than traditional programmable thermostats in reducing energy usage by maintaining a lower energy usage setpoint that the occupant is willing to tolerate. Additionally, while doing so, the various embodiments also remove the guess-work and effort on the part of the occupants.

FIG. 1 schematically shows a system 100 controlled using biofeedback data according to an illustrative embodiment. The system 100 includes the programmable thermostat 102 (i.e., controller) that operates with a set of biofeedback sensors 106 to control a climate control system 108 (not shown—see FIG. 9). The biofeedback sensors 106 capture direct or indirect physiological attributes of at least one building occupant 110. The biofeedback sensors 106 transmit these attributes as the sensor data 112 to the programmable thermostat 102 to establish a control setpoint 104 for the programmable thermostat 102.

Various types of biofeedback information of physiological responses may be suitable in determining the comfort, discomfort, or stress state of an occupant of a building. Direct measurement of such biofeedback information may include, for example, measurements of body temperature, brain activity, heart rate, breathing rate, and presence of specific/degree of voluntary muscle activity. Indirect measurement may include movements and sounds.

In addition to determining a specific setpoint, to optimize energy usage and comfort, the programmable thermostat 102 may send commands 114 to specific components of the HVAC system 108. These specific components may include, for example, a blower and fan motor 116, a compressor 118, as well as other AC components 120. The programmable thermostat 102 may determine the energy usage of individual components (e.g., blower, fan motor, and compressor). A method of identifying the power demand of components of a climate-control system is disclosed in, for example, U.S. Provisional Application No. 61/713,740, titled "A Method of Identifying Heating and Cooling System Power-Demand," filed Oct. 14, 2012. The application is incorporated by reference herein in its entirety.

The programmable thermostat 102 may determine an efficiency characteristics for each components for a given environment condition (e.g., outside temperature and humidity) to regulate each component. Generally, efficiency performance of components may vary based on environment conditions. The efficiency information may then be used to determine an optimal control setpoint for a given condition. For example, in humid weather, the programmable thermostat 102 may operate the compressor at a high setting and the fan at the medium setting as removing humidity from the controlled space makes the environment feel cooler. As such, in dryer weather, the programmable thermostat 102 may run the compressor at a lower setting and the fan at a higher setting.

Activity and Physiological State

The programmable thermostat 102 may establish the control setpoint 104 according to activities and occupancy/non-occupancy of the occupant 110. Activities generally refer to distinct physiological states of the body in terms of biological responses. Activities may include, for example, sleep and exercise. The programmable thermostat 102 may use activities in conjunction with occupancy to establish the control setpoint. A lack of any physiological activity, for example, may indicate the controlled space is vacant and that a lower energy-usage setpoint may be desired.

Figure 2:
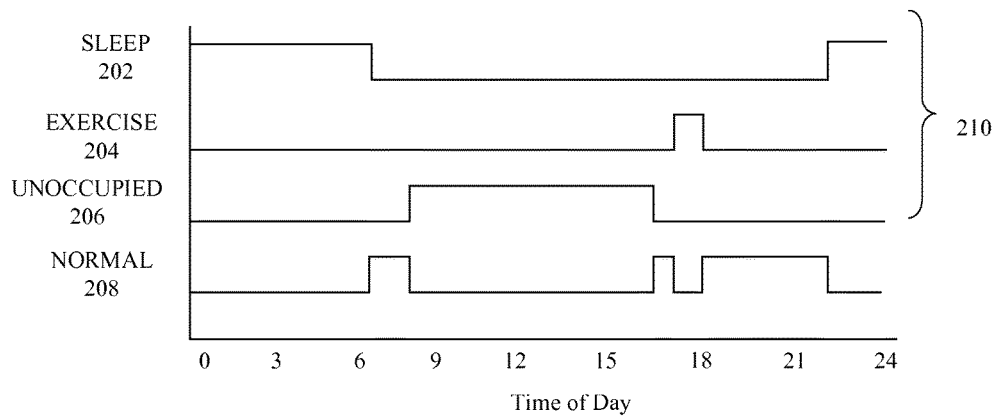
FIG. 2 illustrates a control operation of a programmable thermostat in establishing a control setpoint based on observed physiological responses according to an illustrative embodiment.

FIG. 2 illustrates a control operation of the programmable thermostat 102 in establishing the control setpoint 104 based on physiological responses according to an illustrative embodiment. Here, the programmable thermostat 102 is in a residential building and is configured to vary between a sleep state 202, an exercise state 204, and an unoccupied state 206, and a normal state 208. For example, over the course of a 24-hour cycle, an occupant 110 may be asleep between 10 P.M. and 6:30 A.M., awake between 6:30 A.M. and 10 P.M., exercising between 5:30 P.M. and 6 P.M., and out of the building between 8:30 A.M. and 4:00 P.M. The programmable thermostat 102 may establish a sleep control setpoint for the sleep state 202 and an exercise control setpoint for the exercise state 204. The programmable thermostat 102 may also establish an unoccupied control setpoint when the controlled space is unoccupied (i.e., in unoccupied state 206).

The normal state 208 may be the remaining time in the absence of a distinct state 210. Alternatively, the normal state 208 may be a characterized as a general state that is in continuous operation to be overridden by the other states 202, 204, 206.

The programmable thermostat 102 may vary between the various activity states 202, 204 when triggered based on observed physiological states and activities of the occupant 110. The various states and unoccupied state 206 may also be triggered by manual inputs from the occupant 110, such as via a button on the programmable thermostat 102, or remote devices operatively linked to the programmable thermostat 102. Examples of a remote device may include a mobile phone, an alarm clock, or a photo frame.

The specific controls of the various activity states are now described.

Sleep State

Sleep state 202 may be determined from any of various types of sleep physiological responses. During sleep, the heart rate, breathing rate, and core body temperature generally decrease. Additionally, during sleep, specific brain activities and certain muscle activities may be observed, including, for example, formations of alpha and delta brain-wave patterns as well as specific eye muscle movements as observed during rapid-eye movement (REM) sleep.

Figure 3:
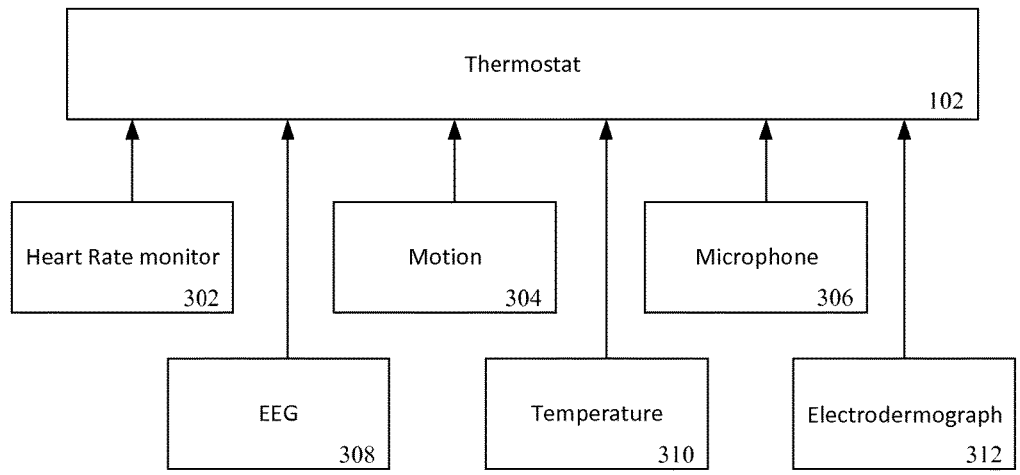
FIG. 3 schematically shows a system for interfacing with biofeedback sensors to provide biofeedback information when the occupant is in a sleep state.

FIG. 3 schematically shows a system for interfacing with biofeedback sensors to provide biofeedback information when the occupant is in a sleep state. The programmable thermostat 102 may interface with at least one of a heart rate monitor 302, a motion detector 304, a microphone 306, an electroencephalography (EEG) 308, a temperature monitor 310, and a electrodermograph 312. Direct measurements of discomfort during sleep may be observed in measurements of body temperature, perspiration, and certain brain activities. Indirect measurements of the discomfort may be observed as i) specific voluntary muscle movement, such as twisting and turning, ii) general body movements, and iii) body sounds, such as snoring. According to an illustrative embodiment, a motion sensor may be placed in the occupant's bedroom or sleeping area to monitor for movements.

Several principles of operations of establishing the controllable setpoint is contemplated during a sleep state. The controller may passively monitor physiological responses of the occupants during a learning period. Here, the controller may rely on the occupant to set the controllable setpoint, and the controller merely collects the resulting observed physiological responses. The observed responses may then be used to establish the controllable setpoint by augmenting the occupant's selection or replacing it.

Figure 4A:
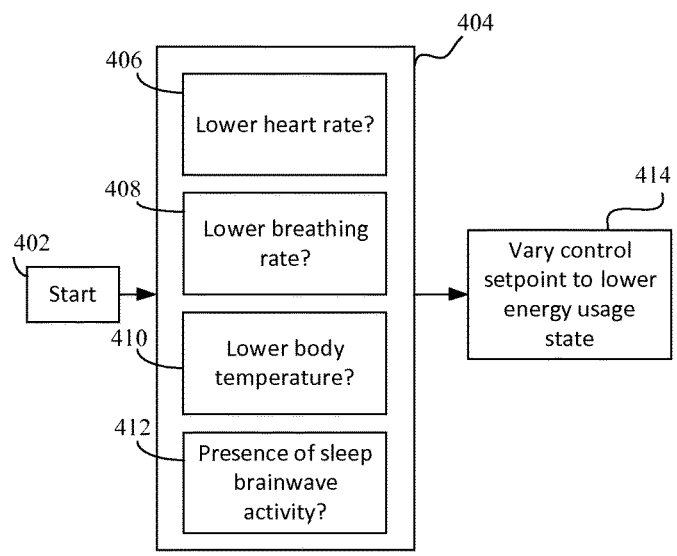
FIG. 4A illustrates a flow diagram of a method of varying the control setpoint upon start.
Figure 4B:
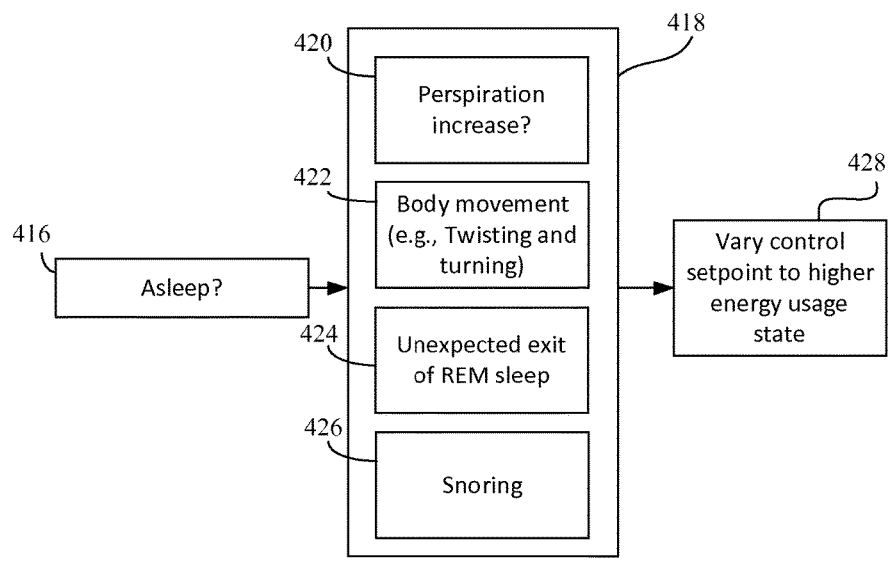
FIG. 4B illustrates a flow diagram of a method of varying the control setpoint during a sleep state.

Alternatively, the controller may actively vary the controllable setpoint. FIGS. 4A-B illustrate flowcharts of a programmable thermostat 102 actively varying the controllable setpoint during the sleep state 202. Similar controls may be employed for other type of control states, such as for example, the exercise state 204 and the normal state 208.

Here, the programmable thermostat 102 may vary at least one controllable setpoint to a lower energy usage state or level until a physiological response of discomfort or stress of the occupant is observed.

The responses may include changes in eye movement (i.e., unexpected exit of REM sleep), presence of snoring, twisting and turning, perspiration, or erratic brain wave activities. In instances where the discomfort is so severe, the person might awake and move around the room.

For example, in FIG. 4A, upon a start 402, various types of physiological states may be monitored 404 from the sensor data 112, including, for example, a lower heart rate 406, a lower breathing rate 408, a lower body temperature 410, or a presence of a sleep brainwave activity 412 (e.g., alpha or delta waves). Upon at least one of physiological states 406, 408, 410, 412 (if employed) being detected, the programmable thermostat 102 may vary the sleep control setpoint 104 to a lower energy usage state 414.

Lower energy usage states may vary by the seasons, the occupants, and the time of day. For example, during the summer months, a higher temperature (e.g., between 1-10 degrees Fahrenheit) or humidity setpoint may be set. Similarly, during the winter months, a lower temperature (e.g., between 1-10 degrees Fahrenheit) may be set.

The start 402 may be triggered by various mechanisms. For example, a manual input may trigger the start 402. The manual input may be part of the interface on the programmable thermostat 102, or it may be a remote device operatively coupled to the programmable thermostat 102. The programmable thermostat 102 may also trigger the start 402 based an expected sleeping schedule. The start 402 may also be initiated by physiological states 406, 408, 410, 412 being observed.

In FIG. 4B, once in a sleep state 416, the programmable thermostat 102 may monitor for at least a physiological state 418 associated with discomfort. Physiological state 418 may include a higher perspiration rate 420, a specific or any body movements 422, an unexpected exit from REM sleep 424, or a presence of snoring 426. Upon any or a combination of such physiological states 420, 422, 424, 426 being detected, the programmable thermostat 102 may vary the sleep control setpoint 104 to a higher energy usage state 428.

Continuing from the above example, after lowering the temperature, the programmable thermostat 102 detects discomfort being experienced by the occupant 110. The programmable thermostat 102 may then increase the temperature setpoint, for example, to a prior setting at a higher energy usage level. Rather than a previously used setting, the programmable thermostat 102 may vary the temperature setpoint to a new setpoint level to provide an alternate data point for the analysis or a smaller degree of change to determine if it yields a better solution (e.g., no discomfort detected).

Figure 4C:
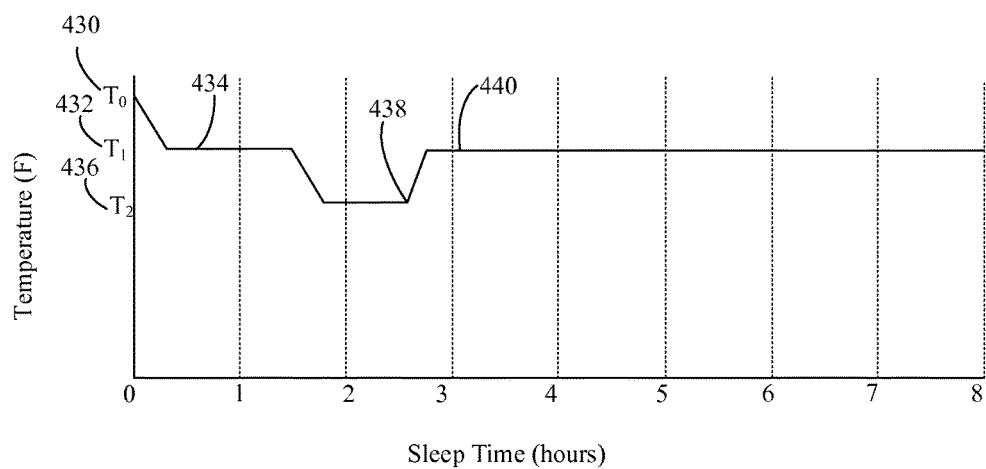
FIG. 4C illustrates the programmable thermostat establishing the control setpoint at a minimum energy usage state of the climate-control system determined for an activity state.

FIG. 4C illustrates the programmable thermostat 102 establishing the control setpoint at a minimum energy usage state of the climate-control system determined for an activity state. The programmable thermostat 102 initializes at controllable setpoint $T_0$ 430 upon a sleep state 416 being observed. The programmable thermostat 102 then reduces the controllable setpoint to $T_1$ 432 and maintains the controllable setpoint at $T_1$ 432 for a specified dwell time 434 before reducing the controllable setpoint to $T_2$ 436. The dwell time 434 may be fixed or varying.

The fixed-dwell time may be established accounting for, for example, the delay in a body's physiological response time and factors such as the isolative characteristics of the clothing worn or covering used. Such and other physiological responses are described in Sawka, Michael N., et al., "Human Adaptations to Heat and Cold Stress", Army Research Institute of Environmental Medicine (2002) and Stroud, M. A. "Environmental temperature and physiological function", Seasonality and Human Ecology (1993), which are incorporated by reference herein in its entirety.

Alternatively, the dwell-time 434 may be determined based on observations of the biofeedback sensors 106. For example, the programmable thermostat 102 may determine that lowering the setpoint (i.e., reduce heating) on a winter night by two degrees F. results in an observed physiological response of the occupant twisting and turning within an hour after the reduction. As such, the dwell-time may be established to be greater than one hour. The programmable thermostat 102 may then further reduce the controllable setpoint to a lower energy state and wait for a physiological response during another dwell time. The programmable thermostat 102 may continue to perform such routines until a physiological response is observed.

Here, either physiological response 404, 418 (shown in FIGS. 4A-4B) is assumed to be observed at a time 438. As such, the programmable thermostat 102 may increase the controllable setpoint to a higher energy usage state 440. The minimum setpoint is therefore established as this higher energy usage state 440. As discussed, the higher state may be a previously established setpoint or a new setpoint.

Occupant Control Profile

When the controller observes a discomfort, it may log the controllable setpoint, the energy usage state, the time, the observed occupant, the activity of the occupant, the sensor type that observed the discomfort, and the environment condition (e.g., inside and outside air temperature, humidity, and sound level). The log may be analyzed to generate a profile for each occupant. The controller may use the profile to establish the controllable setpoint based on the presence or anticipated presence of the occupant. The controller may use the profile to establish the controllable setpoint at the minimum setpoint value for an observed or anticipated activity. The profile includes setpoint relating to season, time of year, outside weather, outside or inside temperature and humidity. Profile may also include transitions between activities.

For example, the controller may observe that during the winter, the occupant experiences discomfort when the room temperature is less than 65 degree F., but during the spring, a similar discomfort is observed at 70 degree F. As such, the controller may establish the controllable setpoint to be slightly higher than 65 degree F. (i.e., plus 1-5 degree F.) during the winter and slightly higher than 70 degree F. during the spring.

Assume further in this example, the physiological response was observed via a motion sensor employed in the bedroom and a wrist-worn temperature sensor worn by the occupant. Additionally, in the example, the controller observed the occupant experienced a drop of 0.5 degree F. in surface body temperature in the extremities (i.e., wrist) as a precursor to experiencing the discomfort. Accordingly, upon sleep being observed, the controller may establish the controllable setpoint at the lower setting more quickly, then monitoring for the drop of body surface temperature or twisting and turning movements by the occupant.

In a corresponding example, during the summer and warm portions of the seasons, the controller may establish the controllable setpoint to be slightly lower than the point that perspiration is observed.

A separate profile may be determined for different combinations of occupants present. For example, when John is the only occupant in the house, the controller may create a profile for John. Consequently, when John and Mary are in the house, the controller may create a new profile for John and Mary. The controller may also combine profiles having a differing setpoint to create a new profile. As such, the controller may select the higher energy usage preference for each given condition where they differ.

In addition, the programmable thermostat 102 may analyze the profile for a pattern. Where a pattern exists, such as in transitions among activities, the programmable thermostat 102 may pre-emptively establish the controllable setpoint for an anticipated activity. For example, the programmable thermostat 102 may anticipate when the occupant 110 may wake up based on (i) the average sleep time of the occupant 110 or (ii) the time when the sleep states 202 generally transitions to normal state 208. As such, the programmable thermostat 102 may pre-warm the building or specific portions thereof.

In addition to anticipating a physiological event as discussed, the programmable thermostat 102 may be configured to condition a physiological response. For example, as the programmable thermostat 102 learns of the occupant's usual bedtimes, it may vary the controllable setpoint to a level that is optimal for the occupant to wind down and prepare for sleep. The occupant may also provide such preferences. Alternatively, the programmable thermostat 102 may monitor for the controllable setpoint that minimizes the amount of time for the occupant to sleep (i.e., enter REM sleep state).

Experiment Routine

According to another embodiment, the controller may operate a series of test routines to determine relationships (i) between the controllable setpoint and comfort or (ii) between energy usage levels and comfort. The test routines may run over the course of several days or months to observe a sufficient range of physiological responses and to provide redundancies in the data. The programmable thermostat 102 may average the observed responses to reduce noise.

During a test routine, the controller may vary the at least one controllable setpoint to a specified energy usage state and collect the resulting physiological responses. Then, using regression analysis, machine learning techniques, or combinations thereof, the controller may correlate the specified energy usage to an associated physiological response or activity. Subsequently, this correlation may be characterized as a transfer function (i.e., defined by a mathematical relationship), which may be stored, and used to optimize a set of controllable setpoints for the climate-control system. Examples of regression analysis and machine learning techniques that may be used include linear regression, logistic regression, dynamic programming (such as with Bellman equation), Hidden Markov Models, Monte Carlo Methods, and Expectation/Maximization optimization techniques.

FIGS. 5A-D illustrate various scheduling routines to vary the sleep control setpoint.

Figure 5A:
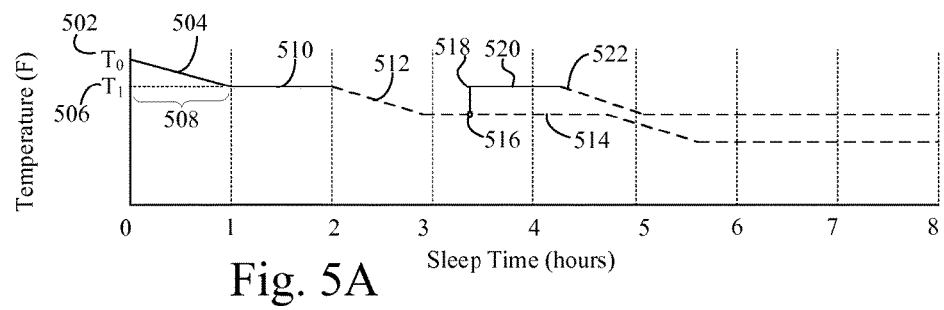

In FIG. 5A, the programmable thermostat 102 varies the controllable setpoint among different energy usage states. The programmable thermostat 102 initializes at controllable setpoint $T_0$ 502. The programmable thermostat 102 reduces the controllable setpoint as a linear ramp 504 to $T_1$ 506 over a specified period 508 and maintains the $T_1$ 506 for a pre-determined period of time 510.

As an example, $T_0$ 502 may be initially set to 70° F.; the setting being the previous control setpoint in the programmable thermostat 102. Then, upon a start of the sleep state 202, the temperature setpoint is lowered to 68° F. over the course of an hour 508 (here, assuming a heating day). The temperature setpoint is then maintained at 68° F. over the course of a second hour.

Subsequently, the routine may include additional energy-usage reduction 512 (i.e., a second, third, etc. lowering of the temperature setpoint) over the course of the sleep cycle. As such, for each energy-usage reduction, the routine may vary the dwell time 514 and the magnitude of change. The magnitude of change may be in temperature units (e.g., degree Celsius or Fahrenheit) or energy reduction (e.g., in energy unit, such as, for example, BTU (British thermal units) or kilowatts). Referring back to the example, after the temperature setpoint has been maintained at 68° F. over the course of the second hour 510, the temperature may be reduced 512 in a second action from 68° F. to 65° F. over the course of an hour and then held for another two hours 514.

While running the scheduled routine, the programmable thermostat 102 monitors for physiological responses or activities 416 associated with discomfort by the occupant 110. Consequently, if physiological response is detected, the programmable thermostat 102 may vary the controllable setpoint to a higher energy-usage state 414. Continuing from the above example, the temperature has been reduced 512 in a second action from 68° F. to 65° F. over the course of an hour. Rather than the setpoint being held at 65° F. for two hours 514 (as indicated in the previous example), the programmable thermostat 102 detected at least one of a physiological response 418, 420, 422, or 424 at time 516. The programmable thermostat 102 may increase 518 the temperature setpoint back to 68° F. The setpoint is held 520 at 68° F. for an hour. If sufficient time remains in the sleep cycle, the programmable thermostat 102 may run additional energy reduction routine 522.

Alternatively, rather than responding to the observed physiological response, the programmable thermostat 102 may maintain the reduced energy state for the specified dwell time to more comprehensively collect data of the observed physiological response.

Various scheduling routines are contemplated. For example, the programmable thermostat 102 may vary the controllable setpoint in a repeating time routine between two energy usage states corresponding to $T_0$ 502 and $T_1$ 506

Figure 5B:
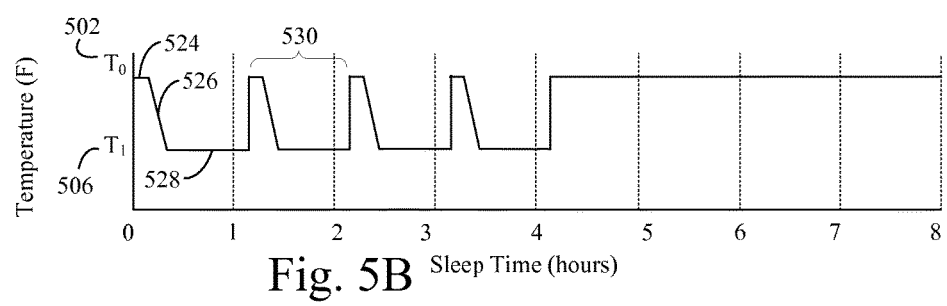

(FIG. 5B). For each repeating time routine, the controllable setpoint may be lowered 524 to a lower energy state, for example, in a linearly, quadratic, or exponential manner. The setpoint is then maintained 528 for a fixed period 530.

Alternatively, the programmable thermostat 102 may vary the controllable setpoint in a repeating time routine among differing energy usage states or differing dwell-time.

Figure 5C:
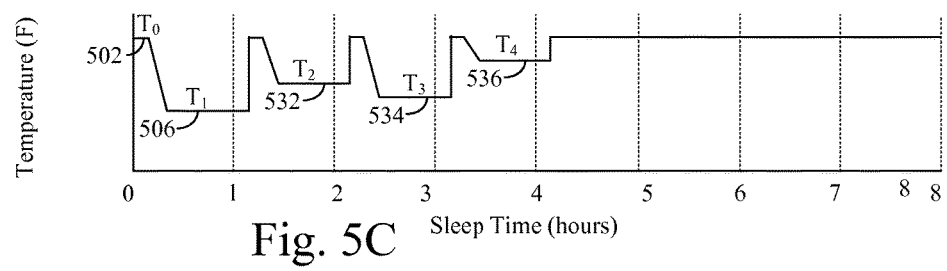

In FIG. 5C, the programmable thermostat 102 may select from a set of differing controllable setpoints: $T_0$ 502, $T_1$ 506, $T_2$ 532, $T_3$ 534, $T_4$ 536, etc. The controllable setpoints may be randomly selected within a preference range or band specified by the occupant.

Figure 5D:
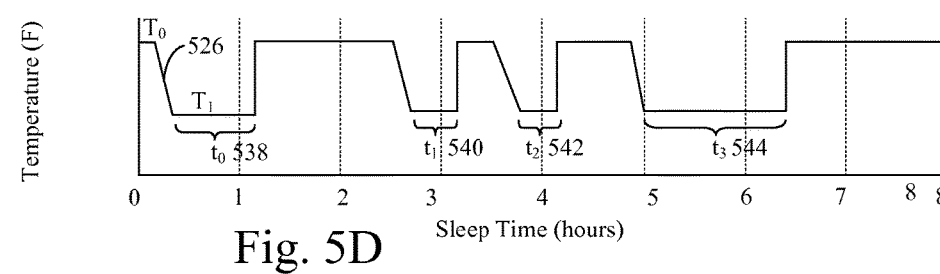

In FIG. 5D, the programmable thermostat 102 may vary the dwell-time among different periods: $t_0$ 538, $t_1$ 540, $t_2$ 542, $t_3$ 544, etc.

In FIG. 5E, rather than returning to the initial setpoint or previous set of setpoints, the programmable thermostat 102 may vary the controllable setpoint to levels. Here, the setpoint vary among the set of controllable setpoints $T_0$ 546, $T_1$ 548, $T_2$ 550, $T_3$ 552, $T_4$ 554, $T_5$ 556, $T_6$ 558, $T_7$ 560, etc. This scheme provides more setpoints for analysis compared to previously described routines, and may allow for faster learning or programming of the programmable thermostat 102.

Rather than by time, the programmable thermostat 102 may vary the controllable setpoint based on physiological cycles (e.g., REM cycle during sleep). As such, in FIG. 5F, the programmable thermostat 102 varies the controllable setpoint based on detected REM cycles of the occupant: $C_1$ 562, $C_2$ 564, $C_3$ 566, and $C_4$ 568.

In FIG. 5G, the programmable thermostat 102 may vary the dwell-time and the controllable setpoint. The dwell-time may vary, for example, as a percentage of the REM sleep cycles (e.g., $t_0$ 570, $t_1$ 572, $t_2$ 574, $t_3$ 576, $t_4$ 578, $t_5$ 580, $t_6$ 582, $t_7$ 584, $t_8$ 586, $t_9$ 588, $t_{10}$ 590, $t_{11}$ 592). As such, the programmable thermostat 102 may determine an optimal temperature for different REM cycle.

Regardless of the test routine employed, the programmable thermostat 102 may average, integrate, or time-delay the sensor data 112 to determine whether a physiological response or activity 404, 418 is observed.

Exercise State and Normal State

Exercise state 204 may be determined based on any of various types of exercise physiological state. Similar to the sleep state 202, the programmable thermostat 102 may receive the sensor data 112 from any of various types of sensors that detect or measure at least one of temperature, motion, heart rate, breath rate, sound, temperature, and perspiration.

Rather than varying the controllable setpoint to a lower energy state, in the exercise state 204, the programmable thermostat 102 may vary the controllable setpoint to a higher energy state to improve the physiological performance of an occupant or to minimize discomfort in anticipation of a physiologically stressed event (e.g., exercise or a physical exertion).

In the exercise state 204, the programmable thermostat 102 is configured to measure a physiological response and activity corresponding to exercise and/or elevated indoor physical exertion. For example, a measurement over a course of an exercise session may indicate that an occupant when at rest has a heart rate of 60-80 beats per minute (bpm) and when exercising, a heart of 100-150 bpm.

As such, when the programmable thermostat 102 detects a heart rate within the exercise heart rate range, the programmable thermostat 102 may set the controllable setpoint to a lower temperature to minimize overheating by the occupant. Subsequently, when the heart rate returns to the occupant's rest heart rate, the programmable thermostat 102 may return the controllable setpoint to a lower energy state, such as the last setpoint prior to the exercise state 204. Alternatively, the programmable thermostat 102 may also establish the controllable setpoint at a lower energy state until discomfort is detected. As indicated, such discomfort may be characterized a presence of perspiration, a higher body surface temperature (i.e., too warm), or a lower body surface temperature (i.e., too cold).

Unoccupied State

Unoccupied state may be used in conjunction with observed physiological activities to optimize or reduce energy usage. Unoccupied state 206 may be determined based on any type of physiological state, particularly the lack thereof. Depending on the biofeedback sensors 106 (direct or indirect) employed, a lack of the sensor data 112 or a null data value from the biofeedback sensors 106 may indicate the occupant 110 is outside the controlled space. The programmable thermostat 102 may establish the controllable setpoint at a lower energy state subsequently to reduce energy usage. Here, the minimum setpoint maybe the lowest setpoint specified by the occupant.

Sensors

Biofeedback sensors 106 may include any sensors or instruments that may detect or measure any of various physical quantity that may be converted into a signal, for example, capacitance, resistance, electric-potential, and mechanical motion. Such sensors may include an accelerometer, a pedometer, cameras, microphones. The sensors may also include specialized physiological measurement instrument including electromyographs, electrodermographs, electroencephalographs, photoplethysmography, electrocardiographs, pneumographs, capnometers, pheoencephalographs, and hemoencephalographs (e.g., near infrared, passive infrared). Biofeedback sensors may include at least two types: 1) wearable biofeedback sensors to be carried by or on the occupants and 2) mountable sensors placed with the building controllable space.

Figure 6:
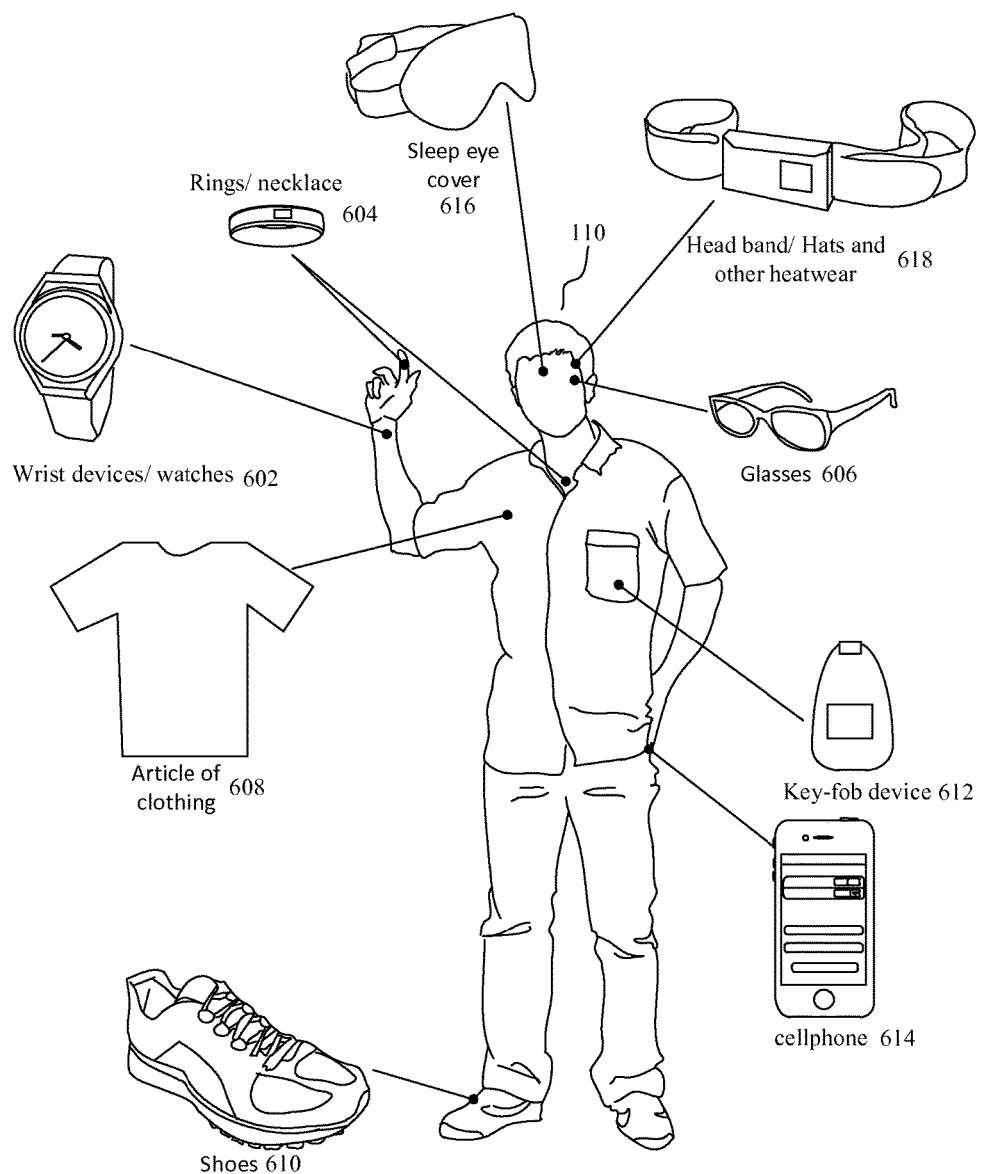
FIG. 6 illustrates examples of wearable biofeedback sensors.

Sensors may be embedded in or are part of objects carried in pockets of a person, including: mobile devices (e.g., cell-phone, pagers) and key-fobs; sensors embedded in articles of clothing, footwear, and eyewear; and devices that may be clipped onto articles of clothing. FIG. 6 illustrates examples of wearable biofeedback sensors (e.g., items 602 to 618). Wearable biofeedback sensors may include any various types of sensors, including sensors that directly or indirectly measure physiological responses of a person. Wearable biofeedback sensors include sensors or instruments placed comfortably near or around the skin of a person, particularly around the head and eyes, sensors embedded (e.g., sewed) in articles of clothing, and sensors that may be carried around in pockets or attachable onto articles of clothing.

Examples of sensors or instruments placed comfortably near or around the skin may include, for example, a wrist worn device or watch 602, a ring, necklace, or neck chain 604, and glasses, goggles, or eyewear 606. Such sensors may directly measure physiological response or activity, such as body temperature, heart rate, and muscle activity. There are commercially available heart-rate monitoring devices, such as Fuelband® by Nike® (Beaverton, Oreg.).

Sensors embedded (e.g., sewed) in articles of clothing may include any of various outside and inside garments (e.g., shirts, pants) 608, and shoes/footwear 610. Such sensors having contact with the skin may directly measure body temperature, heart rate, and muscle activity. If not in direct contact with the skin, these sensors may be configured to make indirect physiological measurements, such as through sound, and movement.

Sensors may be carried around in pockets or attached onto clothing. Such sensors may include key-fob devices 612 and cellphones 614. Key-fob like devices may include a clip that attaches onto clothing, belts, and such. These devices may indirectly measure physiological measurements, such as sound, and movement. Due to their mobility, these devices may be configured to be aggregators of the sensor data 112 and as well a communication interface to the programmable thermostat 102. There are existing products that are key-fob like, such as Fitbit Aria® by Fitbit, Inc. (San Francisco, Calif.).

Devices that may be placed around the head or near the eyes may include sleep eye cover 616, head band, caps, hats and other headwear 618. Being close to the head or eyes, these devices may be used to measure brainwave activity, eye movement, or various muscles on the face. There are sleep quality monitoring system, such as that developed by Zeo, Inc. (Boston, Mass.) that monitors the brainwave activity to determine the quality of REM sleep.

Sensors may also be placed in the controlled space of the building, including wall-mounted, ceiling-mounted, and floor-embedded devices, table-top devices, and devices embedded in furniture and appliances.

The sensor data may be aggregated to improve the detection level of physiological responses or activities or to reduce noise in the measurement. The sensors may operate independently or in combination with other sensors of differing types.

Figure 7:
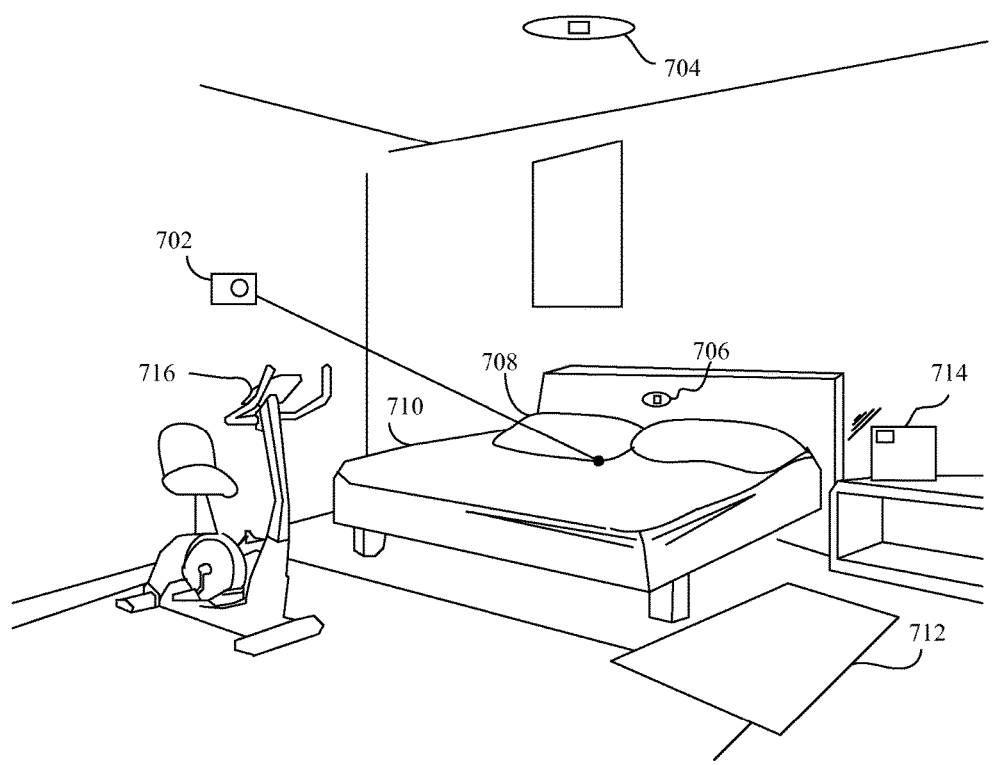
FIG. 7 illustrates examples of mountable biofeedback sensors.

FIG. 7 illustrates examples of mountable biofeedback sensors (e.g., items 702 to 716). Similar to wearable biofeedback sensors, mountable biofeedback sensors may directly or indirectly measures a physiological response or activity, including motion, degree of movement, sound, temperature, and brain activity. Mountable biofeedback sensors may include any of various types of sensors that may be placed on room surfaces (e.g., wall sensor 702, ceiling sensors 704), furniture pieces 706, and articles that come into direct contact with a person (e.g., pillows 708, blankets 710, or carpets or rugs 712). Mountable biofeedback sensors may also include a sensor article 714 that may be placed on furniture and table tops. These sensors may also include sensors embedded as part of exercise machines 716.

Wall or ceiling sensors 702, 704 may include microphones, motion detectors (e.g., infrared, capacitive, laser, and radar), video cameras (e.g., CCD, CMOS, thermal, and infrared). Similarly, furniture pieces 706 may be equipped with such sensors.

Similar to the headwear and the eye wears 606, 616, and 618, a pillow 708 may measure motion, degree of movement, sound, temperature, heart rate, brain activity, and perspiration. Blankets 710 may measure, for example, temperature, heart rate, breathing rate, and perspiration (as well as moisture). Carpets or rugs 712 may include exercise mats (e.g., yoga mats) and may measure perspiration, heart rate, sound, movement, and temperature.

The biofeedback sensors 106 may communicate biofeedback data 112 to the programmable thermostat 102 by any of various mechanisms. For example, the biofeedback sensors 106 may directly interface with the programmable thermostat 102 and transmit raw sensor readings. Alternatively, the programmable thermostat 102 may interface with an aggregator system that interfaces to the various sensors 106 to provide the programmable thermostat 102 with specific physiological information. For example, rather than the receiving raw brain wave patterns, the programmable thermostat 102 may receive REM cycle information from the aggregator system that has processed the raw brain wave signals.

The biofeedback sensors 106 may include life-sign detectors to detector physiological activity. Such life-sign detector may include such devices as discussed in M. D'Urso et al., "A Simple Strategy for Life Sign Detection Via an X-Band Experiment Set-up", Progress in Electromagnetics Research C, Vol. 9, pp. 119-129 (2009), incorporated by reference herein in its entirety.

Table 1 provides a summary the various types of sensors and the corresponding physiological response or activity to be measured.

TABLE 1

| Physiological Response | Type of Measurement | Types of Sensors |
| --- | --- | --- |
| Heart rate | Direct | Electrocardiographs (EEG), photoplethysmographs (PPG) |
| Breathing rate | Direct | Electromyographs |
| Body temperature | Direct | Infrared camera, thermistor, |
| Perspiration | Direct | Electrodermographs, pneumographs |
| Sleep brainwave activity (change in specific alpha or delta waves) | Direct | Electroencephalographs |
| Specific Voluntary Muscle activity (twisting and turning) | Direct | electromyographs |
| Specific Voluntary Muscle activity (getting up) | Direct | Accelerometer, capacitance, pressure sensor, electromyographs |
| Specific physiological activity (snoring) | Direct/indirect | Microphone |
| Specific Voluntary Muscle activity (twisting and turning) | Indirect | Camera; motion detector |

Controls

Figure 8A:
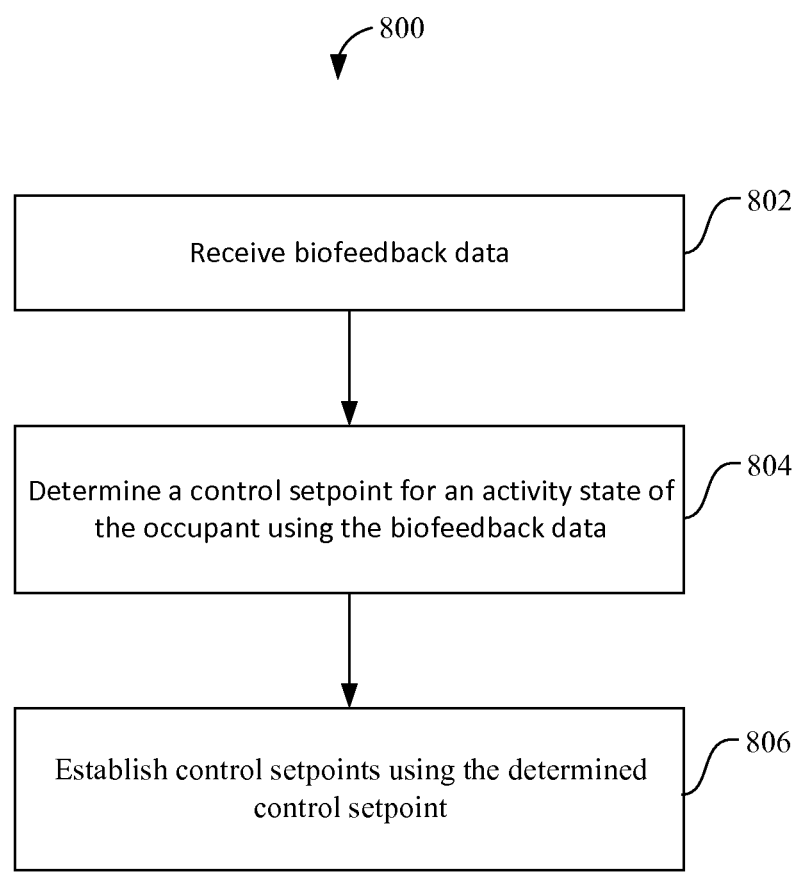
FIG. 8A schematically illustrates a method according to an illustrative embodiment.

FIG. 8A schematically illustrates a computer-implemented method 800 according to an illustrative embodiment. The computer-implemented method 800 allows for the controlling of a climate-control system in a building.

The computer system receives biofeedback data (operation 802). The computer system may directly communicate with sensors or an external database provided by a third-party provider. As such, the sensor may directly provide the biofeedback data to the computer system, or the third-party provider may indirectly provide the biofeedback data. The biofeedback data may be a time-based signal of a measurement from the biofeedback sensors.

The computer system may determine a minimum energy usage state of the climate-control system for the determined activity state using the biofeedback data (operation 804). The activity state may refer to a physiological response of the occupant. As such, the minimum energy usage state may be the controllable setpoint where a physiological response of discomfort is observed. The observation may be a direct measurement from a biofeedback sensor or an indirect measurement of a series of sensor input having a statistical significance as determined from a regression of a finite mixture model.

The computer system may determine the physiological response or the activity state of the occupant using regression analysis, machine learning techniques, and a combination thereof. Examples of regression analysis and machine learning techniques that may be used include linear regression, logistic regression, dynamic programming (such as with Bellman equation), Hidden Markov Models, Monte Carlo Methods, and Expectation/Maximization optimization techniques.

The computer system may employ stochastic models to predict the likelihood of the occupant experiencing comfort or discomfort due the changing of the control setpoints. As such, the computer may employ the likelihood of discomfort to balance with the energy usage of the climate control system. Alternatively, the likelihood may be employed as a penalty in optimizing the energy usage.

In an embodiment, the computer system may employ a finite mixture model using standard linear models, generalized linear models, and model-based clustering. The finite mixture model may be implemented using the expectation-maximization algorithm, such as employed by the FlexMix software tool package. A user manual of FlexMix may be found at http://cran.r-project.org/web/packages/flexmix/index.html. The manual is incorporated herein in its entirety.

The computer system may establish the control setpoint using the determined minimum energy usage state (operation 806) at which the physiological response of discomfort is not observed.

In addition or alternative to, the computer system may anticipate or predict controllable setpoint when a physiological response may occur. As such, the controllable setpoint may be established based on such predictions and estimation rather than on each instance of observed physiological response. The predictions and estimation may be based on a historical log or previously observed physiological responses.

According to an embodiment, the programmable thermostat 102 operates with the motion sensor 702 placed in the bedroom. The motion sensor 702 is configured to sense motion, particularly twisting and turning action during sleep. As such, the biofeedback data 112 of the motion sensor may include time signal or event log of a) the energy reduction state and/or controllable setpoint, b) the frequency of motion, and c) sleep time. Various other data may be used in the analysis, including environment conditions, such as outside temperature, humidity, pollen levels, wind chill, weather, and outside noise levels.

In an embodiment, the computer system may correlate the controllable setpoint with each observed physiological response. The correlation may also use linear regression, logistic regression, dynamic programming (such as with Bellman equation), Hidden Markov Models, Monte Carlo Methods, and Expectation/Maximization optimization techniques. The correlation may be characterized as a transfer function, which may be stored, and used to optimize a set of controllable setpoints for the climate-control system. The computer system may use biofeedback data, climate control data, and energy usage data of similar premises. Examples of determining similar premises are disclosed in U.S. Patent Publication No. 2012/0310708 having the title "Method and System for Selecting Similar Consumers" filed May 4, 2012. This application is incorporated herein by reference in its entirety.

In addition, the computer system may correlate the observed physiological response with other factors, including environment condition, individual BMI, weight, % body fat, among other factors. Other characteristics that may be employed include personal characteristics such as age, gender, and physical conditions, such as physical disabilities or disease. These factors and characteristics may be acquired locally by the system or they may be retrieved from databases via the Internet. An example of such a system includes internet enabled weight-scales that records body weight, % body fat, etc. and stores the recorded measurement on an Internet-enabled server. According to an embodiment, such data may be imported from health records of the occupant 110.

The resulting correlation may be directly used to establish the controllable setpoint or may be provided to the occupant for indirect control. As such, the correlation may also be displayed to the occupant for educational purposes.

Programmable Thermostat

Figure 9:
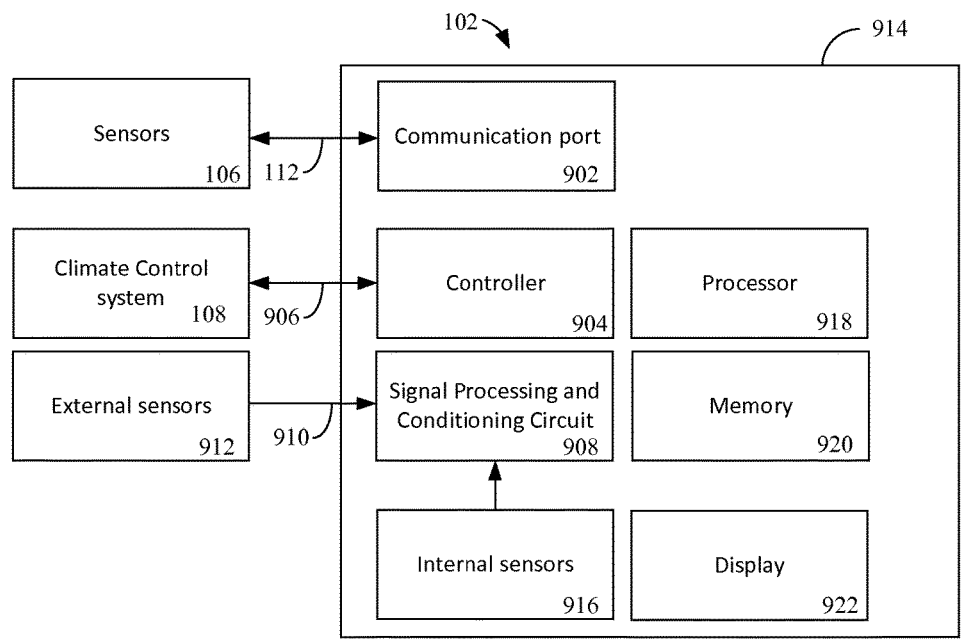
FIG. 9 schematically shows a programmable thermostat according to an embodiment.

FIG. 9 schematically shows a programmable thermostat 102 according to an embodiment. The programmable thermostat 102 includes a communication port 902 configured to interface with a set of sensors 106, including the wearable biofeedback sensors and the mountable biofeedback sensors described above.

According the embodiment, the sensors 106 may be separately controlled via its own or external controller to process biofeedback signal from the sensing components of the sensors. The sensors 106 then transmit the processed biofeedback signal as biofeedback data 112 to the programmable thermostat 100.

The communication port 902 may communicate to the sensors 106 via various types of communication channels. According to an embodiment, the communication port 902 may communicate with the sensors 106 across control wires or over the power line (e.g., X-10, Homeplug (IEEE 1901), IEEE 1675-2008). The communication port 902 may include a radio transceiver to wirelessly communicate with the sensors 106. Example of such wireless communication may include, for example, Wi-fi (IEEE-802.11a,b,g,n), Zigbee (IEEE-802.15.4), WiMax, Bluetooth, infrared, and wireless USB.

The communication port 902 may communicate with external servers to receive commands or any of various types of data from the Internet. The communication port 902 may operate in a local area network or a wide area network.

The programmable thermostat 102 may include a controller 904 to control the climate control system 108. Where the climate control system 108 is a typical HVAC system, the controller 904 may provide control signals 906 to enable or disable the blower or fan motor 116, the compressor 118, and other AC components 120 of the climate control system 108.

The programmable thermostat 102 may include signal processing and conditioning circuitry 908 to receive biofeedback signals 910 from external sensors 912. External sensors 912 refer to sensors located external to a housing 914 of the programmable thermostat 102 and may include raw sensor signals from any of various types of external sensors, including motion or proximity sensors, infrared sensors, and microphones. The signal processing and conditioning circuitry 908 may receive sensor signals from internal sensors 916. Internal sensors 916 may include any of various temperature sensors, including a thermistor, a thermocouple, resistance thermometer, etc. Internal sensors may include any of various types of sensors that may be used in sensors 106 and external sensors 912, such as motion or proximity sensors, infrared sensors, microphones, and camera. The programmable thermostat 102 may include a processor 918, a memory 920, and a display 922.

Figure 10:
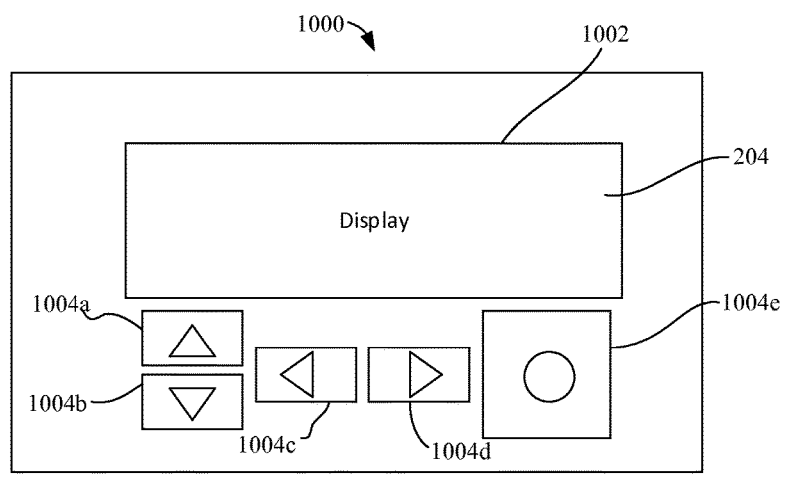
FIG. 10 schematically shows an embodiment of the programmable thermostat of FIG. 9.

FIG. 10 schematically shows an embodiment 1000 of the programmable thermostat 102 of FIG. 9. The thermostat 1000 include a display 1002 and controls buttons 1004a-e.

The various embodiments described above may be implemented in any of various types of system architectures.

Standalone Programmable Thermostat System

According to various embodiments, the processor 918 may have differing roles in the control of the programmable thermostat 102 using the biofeedback data.

According to an embodiment, the processor 918 may perform the described methods or other methods to determine the controllable setpoint based on the biofeedback data 112. The biofeedback data 112 may be stored in memory 920 to be used by the processor 918. The memory 920 may include computer code to execute the various test routines described above.

The processor 918 may additionally operate the control loop (e.g., PI or PID) to regulate temperature in the controlled space (sensed via internal sensors 916, external sensors 912, or sensors 106) via control signals to the controller 904. These control signals may include the cycle time for the AC or furnace unit and fan run time.

Network-Connected Programmable Thermostat

Figure 11:
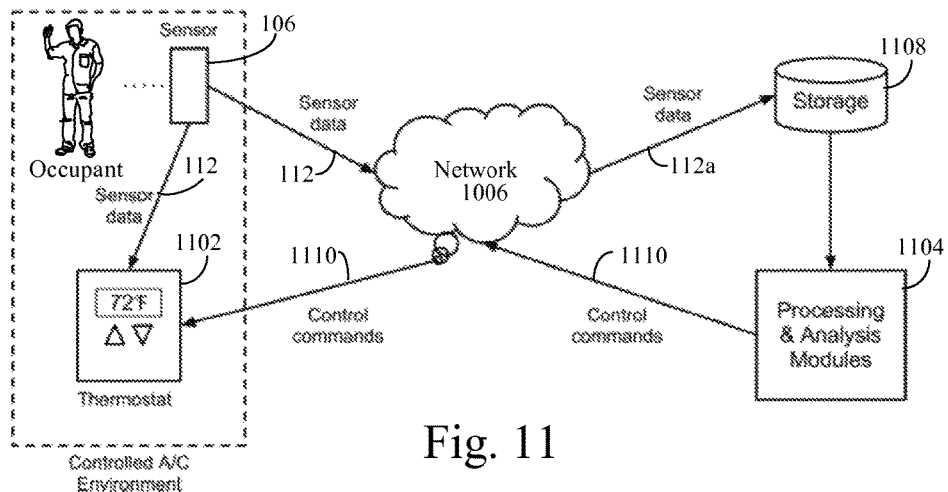
FIG. 11 schematically shows a network-programmable thermostat and a network-analysis system according to an embodiment.

FIG. 11 schematically shows a network-programmable thermostat 1102 and a network-analysis system 1104 according to an embodiment. The network-analysis system 1104 may be referred to as a processing and analysis module. The network-analysis system 1104 receives the sensor data 112 from the sensors 106 across a network 1106 and performs the analysis of the sensor data 112 to determine the correlation between the controllable setpoint and the physiological response and activity sensed by the sensors 106. Storage 1108 stores the sensor data 112 and is operatively coupled to the network-analysis system 1104. The received sensor data 112a may be packaged prior to being transmitted through the network 1006. The network-analysis system 1104 may be a server or a series thereof operating, for example, in a data center.

Subsequent to performing the analysis, the network-analysis system 1104 may transmit the resulting correlated relationship as a control command 1110 to the programmable thermostat 1102. The programmable thermostat 1102 may use the control command 1110 and the sensor data 112 to set the controllable setpoint for the climate control system.

In alternate embodiments, rather than the programmable thermostat 1102 determining the controllable setpoint, the network-analysis system 1104 may determine the controllable setpoint for the climate control system using correlated relationship analyzed from the sensor data 112. The network-analysis system 1104 may then transmit the controllable setpoint as a control command 1110 to the programmable thermostat 1102. Here, the programmable thermostat may merely operate the control loop (e.g., PI or PID) to regulate temperature in the controlled space using the received control command 1110.

Figure 12:
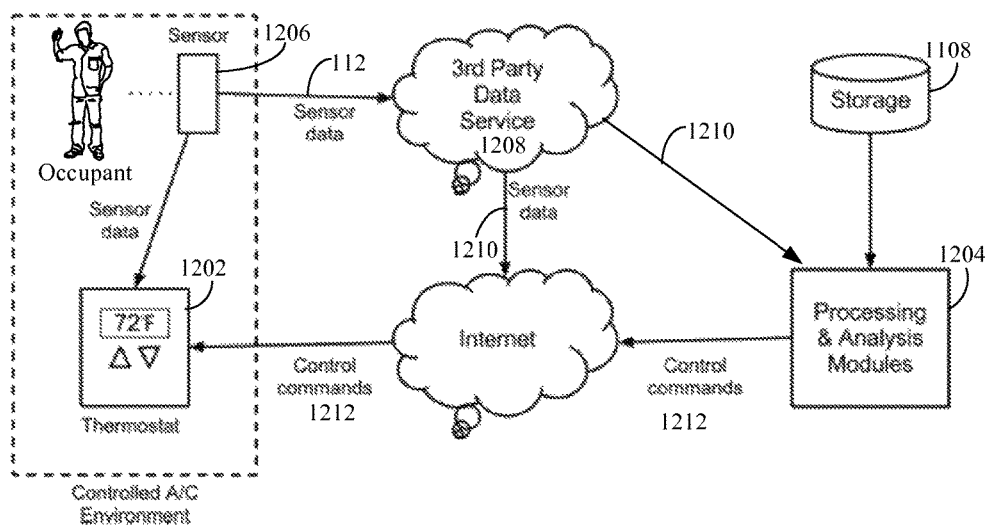
FIG. 12 schematically shows a network-programmable thermostat and a network-analysis system operating with a third-party sensor.

According to another embodiment, the sensors 106 may be part of a third-party system. FIG. 12 schematically shows a network-programmable thermostat 1202 and a network-analysis system 1204 operating with a third-party sensor 1206.

The sensor 1206 may operate with a third-party data service provider 1208. The third-party data service provider 1208 may receive the sensor data 112 and processes it to determine biofeedback attributes. One method of implementation may include using available application programming interface (API), such as that provided by Fitbit, which allows developers to interact with the data in Fitbit's device and software applications. Such API, for example, may be found at http://dev.fitbit.com.

The network-analysis system 1204 may receive the processed biofeedback data 1210 from the third-party data service provider 1208. The network-analysis system 1204 may correlate the processed biofeedback data 1210 and energy usage to determine the controllable setpoint. The network-analysis system 1204 may then transmit the controllable setpoints as a control command 1212 to the programmable thermostat 1202.

Figure 8B:
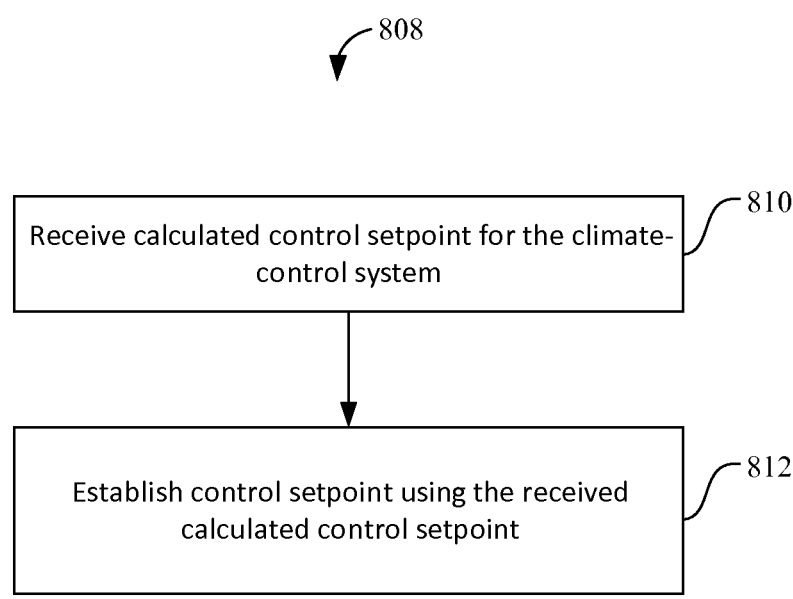
FIG. 8B schematically illustrates a method of operations of network-programmable thermostats according to the illustrative embodiment.

FIG. 8B schematically illustrates a method 808 of operation of a network-programmable thermostat 1102 or 1202 according to the illustrative embodiment. The network-programmable thermostat may receive calculated control setpoint for the climate-control system from the network-analysis system 1104 or 1204 (operation 810). The network-programmable thermostat 1102 or 1202 may establish the control setpoint using the received calculated control setpoint (operation 812). The control setpoint may be determined based on the various methods described herein. The received control setpoint may be stored in a memory module 920.

Alternatively, the third-party service provider may provide the sensor data 1210 to the programmable thermostat 1202. The programmable thermostat 1202 uses the sensor data 1210 and analyzed data from the network-analysis system 1204 to determine the controllable setpoint. The programmable thermostat 1202 then uses the controllable setpoint in a control loop (e.g., PI or PID) to regulate temperature in the controlled space.

It should be apparent that the various embodiments may be employed with various types of buildings, including residential, commercial, and industrial.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention.

What is claimed is:

1. A thermostat comprising:
a communication port configured to interface with a climate-control system of a building; and
a controller configured to establish, via the communication port, at least one control setpoint of the climate-control system, the control setpoint associated with controlling at least one of temperature, humidity, and ventilation of a controlled space in the building,
the controller further configured to, in response to receiving biofeedback data from a sensor associated with an occupant in the controlled space, determine an activity state of the occupant based on at least the biofeedback data;
wherein determining the activity state includes:
(i) determining that the occupant is sleeping and in response, setting the control setpoint to a first setting;
(ii) determining that the occupant is exercising and in response, setting the control setpoint to a second setting; and
(iii) determining that the controlled space is unoccupied and in response, setting the control setpoint to a third setting;
wherein the biofeedback data comprises at least one of a breathing rate, or a body temperature of the occupant;
the controller further configured to, during a learning period for at least a selected activity state included in the activity states:
(i) vary the control setpoint to a plurality of different energy usage states according to a set of pre-determined routines that define a plurality of operational states of the climate-control system to be established during the selected activity state,
(ii) monitor physiological responses or activities of the occupant for each of the different energy usage states during the selected activity state to identify a discomfort threshold of the occupant in the selected activity state, wherein the discomfort threshold is identified from the biofeedback data received from the sensor during the learning period, and
(iii) reset the control setpoint to a setting specific to the selected activity state based on an energy usage state corresponding to the discomfort threshold of the occupant identified during the selected activity state;
wherein after resetting the control setpoint, the controller being configured to control the climate-control system to operate based on at least the reset control setpoint to change at least one of the temperature, the humidity, or the ventilation of the controlled space when the occupant subsequently engages in the selected activity state after the learning period.

2. The thermostat according to claim 1, wherein the reset control setpoint is established at a lower energy usage state for the climate-control system, wherein the lower energy usage state does not affect the activity state of the occupant.

3. The thermostat according to claim 1, wherein the reset control setpoint is established at a higher energy usage state for the climate-control system in a manner to improve an activity state of the occupant.

4. The thermostat according to claim 1, wherein the thermostat further comprises:
a memory to store the set of pre-determined routines.

5. The thermostat according to claim 1, wherein the learning period occurs during a sleeping period of the occupant.

6. The thermostat according to claim 1, wherein the learning period is initiated by at least one of:

(i) the thermostat receiving a manual input from the occupant indicating an on-set of a sleeping period, and (ii) the controller determining the occupant is in a sleep state based on a physiological state of the occupant derived from the biofeedback data.

7. The thermostat according to claim 1, wherein the communication port is further configured to interface with an external database, and the controller is configured to receive, from the external database, biofeedback data of a plurality of biofeedback sensors, including at least one of a wearable biofeedback sensor worn by an occupant of the building and a mountable biofeedback sensor mounted within the controlled space.

8. The thermostat according to claim 1, wherein the controlled space includes at least one of a room associated with sleeping and a room associated with exercising.

9. The thermostat according to claim 1, wherein the sensor is a wearable biofeedback sensor including at least one of an accelerometer, a pedometer, an electromyograph, an electrodermograph, an electroencephalograph, a photoplethysmograph, an electrocardiograph, a pneumograph, a capnometer, a pheoencephalograph, or a hemoencephalograph.

10. The thermostat according to claim 1, wherein the sensor is a mountable biofeedback sensor including at least one of a motion sensor, a proximity sensor, or a microphone.

11. The thermostat according to claim 1, wherein the biofeedback data includes information associated with movements of the occupant.

12. The thermostat according to claim 1, wherein the biofeedback data includes information associated with a quality of sleep of the occupant.

13. The thermostat according to claim 12, wherein the controller is further configured to vary the control setpoint during the learning period based upon a determined stage of sleep derived from the biofeedback data.

14. The thermostat according to claim 12, wherein the controller is configured to, after determining that the occupant is sleeping, set the control setpoint such that a quality of sleep of the occupant remains unchanged.

15. The thermostat according to claim 12, wherein the biofeedback data includes datasets from a plurality of nights.

16. The thermostat according to claim 1, wherein the controller adjusts the control setpoint by lowering a temperature setpoint associated with the controlled space when the occupant therein is exercising, the control setpoint being lowered such that the body temperature of the occupant remains generally constant.

17. The thermostat according to claim 1, wherein the controller is configured to determine and set the control setpoint using information of the occupant associated with body-mass-index, weight, and percent body fat.

18. The thermostat according to claim 1, wherein the control setpoint is determined from the biofeedback data by balancing energy usage of the climate-control system and a comfort metric derived from the biofeedback data.

19. A method of controlling a climate-control system in a building, the climate-control system having a control setpoint associated with at least one of temperature, humidity, and ventilation of a controlled space in the building, the method comprising:

receiving, by a controller, biofeedback data from a plurality of biofeedback sensors that monitor data from at least one occupant, at least one of the plurality of biofeedback sensors including at least one of a wearable biofeedback sensor worn by the at least one occupant of the building and a mountable biofeedback sensor mounted within the controlled space;

determining, via a processor of the controller, an activity state of the occupant based on at least the biofeedback data;

wherein determining the activity state includes:

(i) determining that the occupant is sleeping and in response, setting the control setpoint to a first setting;

(ii) determining that the occupant is exercising and in response, setting the control setpoint to a second setting; and (iii) determining that the controlled space is unoccupied and in response, setting the control setpoint to a third setting;

wherein the biofeedback data comprises at least one of a breathing rate, or a body temperature of the occupant;

via the processor of the controller, and during a learning period for at least a selected activity state included in the activity states:

(i) varying the control setpoint to a plurality of different energy usage states according to a set of pre-determined routines that define a plurality of operational states of the climate-control system to be established during the selected activity state, (ii) monitoring physiological responses or activities of the occupant for each of the different energy usage states during the selected activity state to identify a discomfort threshold of the occupant in the selected activity state, wherein the discomfort threshold is identified from the biofeedback data received from the sensor during the learning period, and (iii) resetting the control setpoint to a setting specific to the selected activity state based on an energy usage state corresponding to the discomfort threshold of the occupant identified during the selected activity state; and after resetting the control setpoint, controlling the climate-control system to operate based on at least the reset control setpoint to change at least one of the temperature, the humidity, or the ventilation of the controlled space when the occupant subsequently engages in the selected activity state after the learning period.

20. The method according to claim 19, wherein setting the control setpoint includes lowering a temperature setpoint associated with the controlled space when the occupant of the controlled space is sleeping such that physiological responses of the occupant remain unchanged, the physiological responses being associated with a quality of sleep of the occupant derived from the biofeedback data.

21. The method according to claim 20, wherein the learning period comprises correlating the biofeedback data to at least one of the control setpoint and climate information at respective time intervals, the correlation including using at least one of linear regression, logistic regression, dynamic programming, Hidden Markov Models, Monte Carlo Methods, and Expectation/Maximization optimization techniques.

22. A non-transitory machine-readable medium storing a computer program product comprising program code for controlling a climate-control system of a residential building, the climate-control system having a control setpoint associated with at least one of temperature, humidity, and ventilation of a controlled space in the residential building, the computer program product when executed by a processor causes the processor to:

receive, by the controller via a communication port, biofeedback data from a plurality of biofeedback sensors, at least one of the plurality of biofeedback sensor including a wearable biofeedback sensor worn by an occupant of the residential building and a mountable biofeedback sensor mounted within the controlled space;

determine, via the processor of the controller, an activity state of the occupant based on at least the biofeedback data;

wherein determining the activity state includes:
- (i) determining that the occupant is sleeping and in response, setting the control setpoint to a first setting;
- (ii) determining that the occupant is exercising and in response, setting the control setpoint to a second setting; and
- (iii) determining that the controlled space is unoccupied and in response, setting the control setpoint to a third setting;

wherein the biofeedback data comprises at least one of a breathing rate, or a body temperature of the occupant;

during a learning period for at least a selected activity state included in the activity states:
- (i) vary the control setpoint to a plurality of different energy usage states according to a set of pre-determined routines that define a plurality of operational states of the climate-control system to be established during the selected activity state,
- (ii) monitor physiological responses or activities of the occupant for each of the different energy usage states during the selected activity state to identify a discomfort threshold of the occupant in the selected activity state, wherein the discomfort threshold is identified from the biofeedback data received from the sensor during the learning period, and
- (iii) reset the control setpoint to a setting specific to the selected activity state based on an energy usage state corresponding to the discomfort threshold of the occupant identified during the selected activity state; and control the climate-control system, after setting the control setpoint, to operate based on at least the control setpoint to change at least one of the temperature, the humidity, or the ventilation of the controlled space when the occupant subsequently engages in the selected activity state after the learning period.

* * * * *